(12) United States Patent
Pal et al.

(10) Patent No.: US 10,270,739 B2
(45) Date of Patent: Apr. 23, 2019

(54) SYSTEM AND METHOD FOR PROTECTING SERVICE-LEVEL ENTITIES

(71) Applicant: Raytheon BBN Technologies Corp., Cambridge, MA (US)

(72) Inventors: Partha Pal, Boxborough, MA (US); Aaron Paulos, Somerville, MA (US); Richard E. Schantz, Sharon, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 0 days.

(21) Appl. No.: 15/668,848

(22) Filed: Aug. 4, 2017

(65) Prior Publication Data

US 2017/0359308 A1 Dec. 14, 2017

Related U.S. Application Data

(63) Continuation-in-part of application No. 15/374,600, filed on Dec. 9, 2016, now Pat. No. 10,158,655, which is a continuation of application No. 13/407,468, filed on Feb. 28, 2012, now Pat. No. 9,560,011.

(51) Int. Cl.
*H04L 29/00* (2006.01)
*H04L 29/06* (2006.01)
*G06F 21/55* (2013.01)

(52) U.S. Cl.
CPC ........ *H04L 63/0209* (2013.01); *G06F 21/552* (2013.01); *H04L 63/0281* (2013.01); *H04L 63/1416* (2013.01)

(58) Field of Classification Search
CPC H04L 63/0209; H04L 63/1416; G06F 21/552
USPC .......................................................... 726/1
See application file for complete search history.

(56) References Cited

U.S. PATENT DOCUMENTS

| 7,412,723 | B2 | 8/2008 | Blake et al. | |
|---|---|---|---|---|
| 7,904,959 | B2 | 3/2011 | Sidiroglou et al. | |
| 8,881,278 | B2 * | 11/2014 | Kaplan | H04L 63/0227 726/23 |
| 2008/0098476 | A1 * | 4/2008 | Syversen | H04L 63/0227 726/23 |

(Continued)

FOREIGN PATENT DOCUMENTS

EP 1641215 A2 3/2006

*Primary Examiner* — Anthony D Brown
*Assistant Examiner* — Michael D Anderson
(74) *Attorney, Agent, or Firm* — Lando & Anastasi, LLP

(57) ABSTRACT

A method for performing security functions in a computer system hosting a network-facing server application includes receiving, by a service request processor, a service request to an application adapted to process the service request; responsive to the service request being a first request for the application to communicate over a network, processing the service request with a first process isolated in memory from the application; responsive to the service request being a second request for the application to access a physical storage device, processing the service request with a second process isolated in memory from the application; and responsive to a determination that the processed service request will not adversely affect the application, providing the processed service request to the application.

20 Claims, 25 Drawing Sheets

(56) References Cited

U.S. PATENT DOCUMENTS

2012/0054744 A1 3/2012 Singh et al.
2014/0173039 A1 6/2014 Newton et al.

* cited by examiner

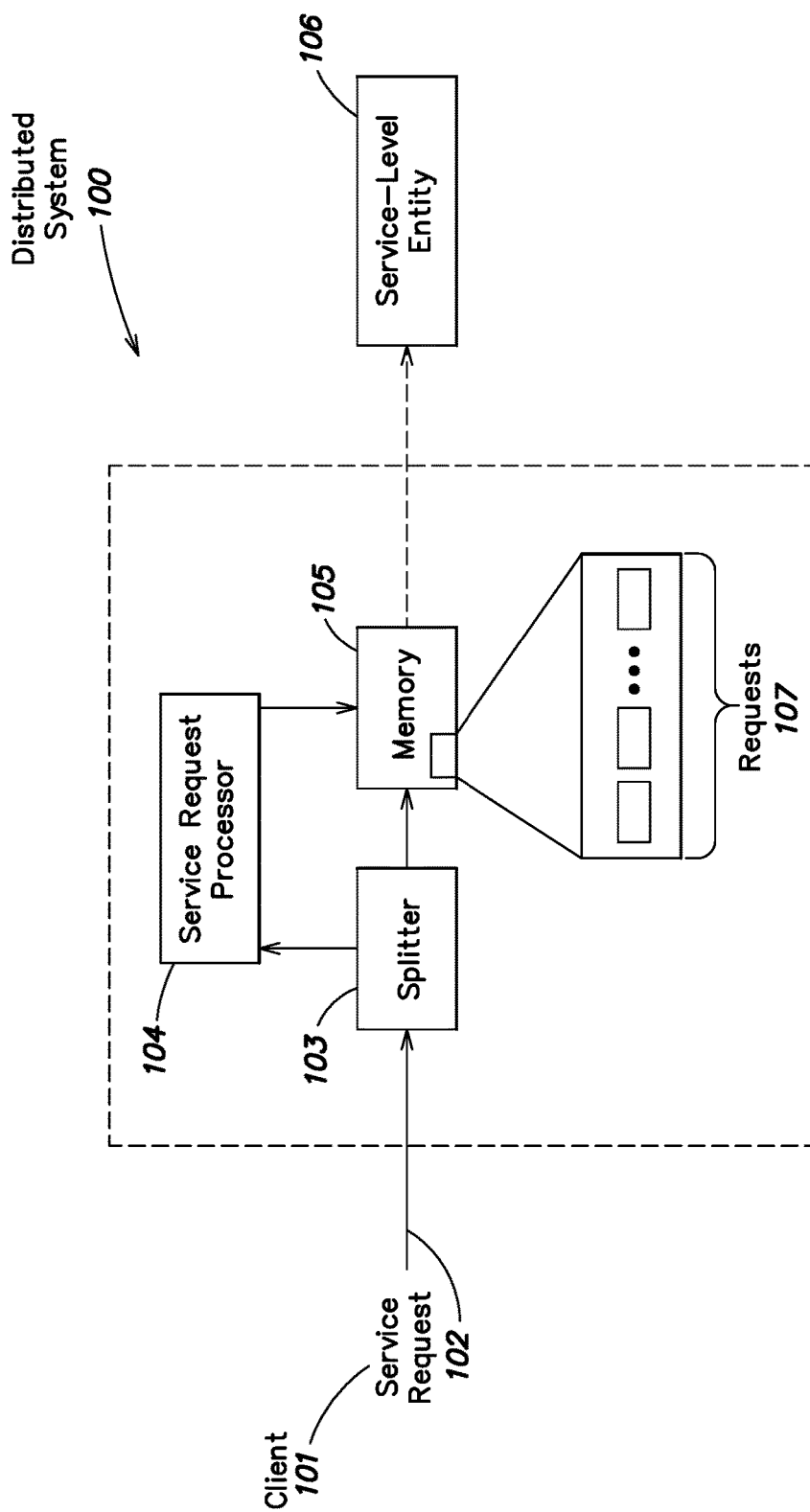

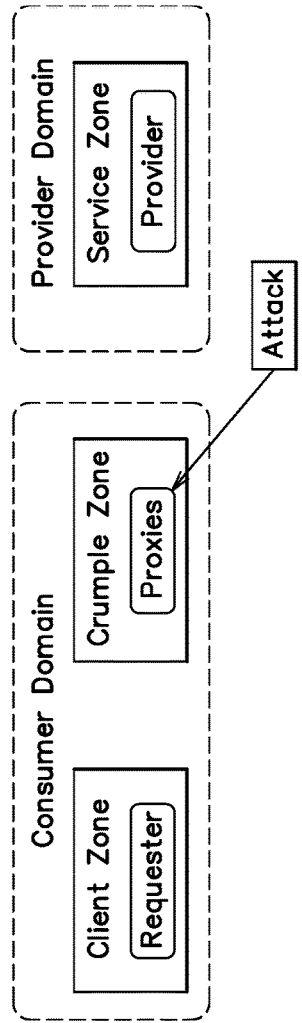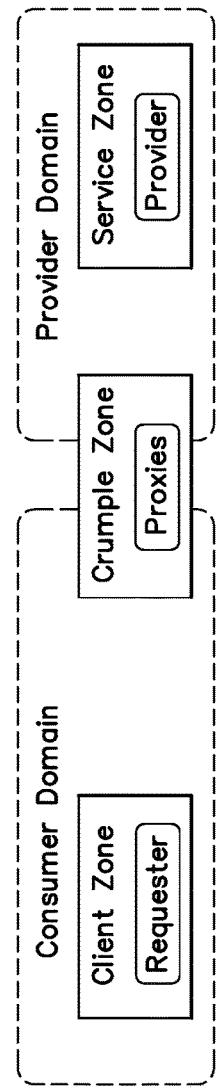
FIG. 17C
FIG. 17D

SYSTEM AND METHOD FOR PROTECTING SERVICE-LEVEL ENTITIES

CROSS REFERENCE TO RELATED APPLICATION

This application is a continuation-in-part of, and claims priority under 35 U.S.C. § 120 to, co-pending U.S. patent application Ser. No. 15/374,600, titled "SYSTEM AND METHOD FOR PROTECTING SERVICE-LEVEL ENTITIES," filed on Dec. 9, 2016, which is a continuation of, and claims priority under 35 U.S.C. § 120 to, U.S. patent application Ser. No. 13/407,468, titled "SYSTEM AND METHOD FOR PROTECTING SERVICE-LEVEL ENTITIES," filed on Feb. 28, 2012, which issued on Jan. 31, 2017 as U.S. Pat. No. 9,560,011, both of which applications are hereby incorporated by reference in their entireties for all purposes.

STATEMENT REGARDING FEDERALLY-SPONSORED RESEARCH OR DEVELOPMENT

This application was conceived and created while working with government funds, Contract number FA8750-09-C-0242.

APPLICABLE FIELD

The field relates generally to distributed computer systems and more specifically to security for distributed computer systems using Service-Oriented Architecture, in particular resilient network-facing server applications.

BACKGROUND

In software systems, Service-Oriented Architecture (SOA) is a set of principles and methodologies for designing software in the form of interoperable services. Services are generally designed as discrete software components that may be reused for different purposes, and among different applications. Many times, these components may perform distinct services that are made available over a communication network to other systems, software applications, and the like. These services and consumers of the services communicate with each other in a well-defined shared format. SOA is used typically in web-based applications, where different services may be provided using standard interfaces that may be accessed by multiple applications. XML (Extensible Markup Language) and JSON (JavaScript Object Notation) standard protocols are typically used for interfacing with SOA services, although different interface types may be used (e.g., Java Remote Method Invocation (Java RMI) that permits remote object function calls, JBoss application server that provides service-oriented portals, etc.).

SUMMARY

According to one aspect of the present invention, it is appreciated that SOA systems are in need of better security. Because service-level systems require loosely-coupled services each having easily accessible interfaces, these services may be attacked by various entities. The SOA paradigm has gained popularity in information systems, many of which play important roles in consumer-based systems and even those used in preserving national security. Critical systems and their services face a highly contested and hostile environment in real-world operations, and must endure and withstand malicious attacks. Potential threats against critical SOA-based systems range from automated network worms targeting SOA platform and supporting services to individual vandals to well-motivated and expert foreign intelligence apparatus that aim to subvert operations in various SOA platforms.

It is appreciated that there are serious lapses in the state of the art in SOA security. As a technology, SOA is still maturing and various aspects of SOA, including security features, are still being standardized. Furthermore, available SOA infrastructure and platforms do not always implement all of the available and specified standards. The complexity of SOA platforms combined with their rapid evolution can lead to implementers under-using or misusing available security features due to lack of expertise. Security of SOA systems is often limited to perimeter and network level security.

Also, it is realized that some of the very features that make SOA appealing (e.g., loose coupling, dynamism, and composition-oriented system construction) make securing servicebased systems more complicated. These features ease the development of systems, but also introduce additional vulnerabilities and points of entry than in self-contained, static, or stove-piped systems. In SOA, services are advertised and are looked up by potential users, many of which might not have the proper authorization to access or use the requested services. It is difficult to predict at design time exactly which actors will attempt to consume a given service and whether they will be authorized to do so. There are various system boundaries with a trust differential—one side is more trustworthy than the other side. Network and perimeter security only reinforce the "crunchy on the outside, chewy inside" view of software systems, and such security is insufficient for developing rugged SOA systems.

According to one aspect of the present invention, a higher level of structural and operational endurance and ruggedness can be achieved in software systems by strategically introducing the concept of a "crumple zone" or CZ in a service-oriented system architecture. Analogous to the crumple zone in an automobile, a CZ stands before particular service components and "absorbs" the effects of attacks by localizing or eliminating the damage they can cause, leaving service components intact and unaffected. According to one aspect, a CZ may be applied to elements of a Service Oriented Architecture (SOA). According to one aspect of the present invention, the CZ may include an outward interface that is accessed by other entities, and the underlying service is not accessed directly. Elements of the CZ receive service requests, analyze them, and determine whether they can be safely executed by the underlying service.

This approach contrasts with the protection of networks (e.g., a firewall) or a system (e.g., by system security software) in that services may be protected individually, even within the same computer system. Such capability provides the granularity of security control necessary to protect service-level entities.

In general, various aspects of the present invention relate to modifying the control and dataflow in a service-oriented architecture for enhanced service security and survivability. According to one implementation, service requests are received and analyzed prior to sending the service requests along to the underlying service. This may be accomplished using, for example, a splitter that receives the requests and sends the request to be analyzed to a service request processor. The service request processor may perform one or more analyses of the service request to determine whether the request should be forwarded to the underlying service. In one implementation, the splitter may send a copy of the service request to a memory where requests that have not yet been sent to the service may be stored. If the service request processor determines that the request is "safe" or otherwise may be processed by the service, the service request processor may instruct the request to be retrieved from memory and sent to the service for processing.

Such software applications implement "services" in a service-oriented architecture (e.g., server applications). Software applications typically interact with their environment. In general, these interactions take place through one of the following paths: over the network, through the storage medium, or through the user interface. A server applications such as a web server or a DNS server are often run "headless"—that is, after startup they do not operate directly via user interface interactions. By contrast, interactive applications (e.g., browsers) interact through all three paths. Process flows, pipelines, or other process mechanisms for handling interactions through these paths are referred to herein as channels. According to some aspects, a mechanism is provided for interposing channel specific interactions. For example, the splitter described herein is an interception mechanism specific to the network channel. A request for access to a network, or to other applications or services connected to the network, may be directed to a network channel CZ, which may contain service request processors configured to process such network access requests. Other modes of interposition of network channel interactions may be provided at different layers of the network stack such at the device driver level, intercepting calls to network libraries etc. As another example, a request for access to memory or storage (e.g., physical disk storage) may be directed to a storage request channel CZ containing service request processors configured to process such storage requests. Here, too, different interposition methods may be provided, including at the device driver level as well as library calls. As yet another example, a request for access to user interface components or devices (such as a keyboard or mouse), may be directed to a user interface (UI) request channel CZ containing service request processors configured to process such UI access requests. As before, there are multiple interposition methods including device drivers and library interposition.

Such specialized channel CZs may perform analysis/inspection, execution, modification, and/or other processing specific to the types of requests they receive, allowing for more customized processing of different types of requests. The use of specialized channel CZs also provides isolation in the event of different types of threats or attacks. For example, in the event that an overwhelming number of network requests are received as part of a denial-of-service (DoS) attack, that event will be dealt with by the network channel CZ, whereas the storage channel CZ and/or the UI channel CZ may continue normal operation.

In one implementation, the service requests may be encrypted, so the implementation may be decrypted prior to or after decrypting the service request. Splitting of the request, either before or after encryption, is referred to herein as network splitting and application splitting, respectively.

Further, according to another embodiment, various security-focused inspection and processing mechanisms may be used to protect service-level entities. Several mechanisms (e.g., signature, emulation type checking) may be used to protect against rate attacks, size attacks, SQL injection attacks, among others. White lists may also be used to identify certain service level requests that should be trusted. In one implementation, an emulation checking referred to herein as a canary proxy may be used to execute service requests separate from the actual service. A flexible management system may be also provided for permitting the user to arrange how certain checking sequences are combined and executed.

According to another aspect, it is appreciated that a flexible and distributed CZ and service architecture may be provided to execute a set of service requests across multiple processing entities to improve fault isolation. For instance, the service request processor may be executed on one or more actual and/or virtual processors, either alone or in combination with other service request processors that receive and analyze service requests in parallel. For instance, a flexible architecture may be provided that permits allocation and assignment of service request processors to one or more virtual machines (VMs), hosts, processors, or other processing entity. Different channel CZs may further be allocated and assigned to one or more VMs, hosts, processors, or other processing entities. Flexible isolation and containment of service interactions in the inspection and processing mechanisms may be provided that permits a service request processor referred to also herein as a mechanism proxy group or MPG. For instance, one mechanism proxy group (MPG) may be assigned per service request received from an entity. One or more MPGs may be assigned to what is referred to as a "neighborhood cluster" which is a construct that allows for isolation between defined groups. For instance, a neighborhood cluster (NHC) may be assigned to a single VM. If the particular VM was compromised, other neighborhood clusters may not be affected. Other neighborhood clusters may be assigned to similar parallel (and therefore redundant) services, and thus the availability of a particular service may be ensured.

In yet another hierarchical construct, a neighborhood may be defined that includes one or more NHCs. In one implementation, a neighborhood including one or more NHCs may be assigned to a single VM. Further, in yet other implementations, MPGs may be installed in a host computer system as a collection of processes, installed on a separate host, or installed on a VM. Such installation options may be selectively configurable by a user.

According to one aspect, a method for performing security functions in a computer system hosting a network-facing server application is provided. The method includes receiving, by a service request processor, a service request to an application adapted to process the service request; responsive to the service request being a first request for the application to communicate over a network, processing the service request with a first process isolated in memory from the application; responsive to the service request being a second request for the application to access a physical storage device, processing the service request with a second process isolated in memory from the application; and responsive to a determination that the processed service request will not adversely affect the application, providing the processed service request to the application.

According to one embodiment, the method further includes, responsive to the service request being a third request for the application to interact with a user interface device, processing the service request with a third process isolated in memory from the application. According to a further embodiment, processing the service request with the third process comprises intercepting the service request using at least one of library interposition and device-driver interposition. According to a still further embodiment, the user interface device is at least one of a keyboard and a mouse.

According to another embodiment, the method further includes, responsive to a determination that the processed service request may adversely affect the application, preventing the processed service request from being provided to the application. According to another embodiment, the method further includes, responsive to a determination that the processed service request may adversely affect the application, logging information about the processed service request.

According to one embodiment, processing the service request with the first or second process comprises inspecting at least one static characteristic of the service request. According to a further embodiment, the at least one static characteristic of the service request comprises at least one of a source of the service request, data payload content, a control payload content, a protocol, and a syntax. According to another embodiment, processing the service request with the first or second process further includes executing the service request in an emulation environment; and inspecting at least one dynamic characteristic of the service request during execution of the service request. According to yet a further embodiment, the at least one dynamic characteristic comprises at least one of an action performed during execution of the service request, an event trace, and a resource usage amount. According to still a further embodiment, executing the service request includes partially executing the service request.

According to another embodiment, processing the service request with the first or second process comprises modifying at least one aspect of the service request. According to a further embodiment, the at least one aspect comprises at least one of a parameter of the service request, a set of data acted upon by the service request, a SQL command, and a result of the service request. According to yet another embodiment, the application is at least one of a server application, a containerized application, and a virtual machine.

According to one embodiment, processing the service request with the first process comprises intercepting the service request using at least one of packet capture and packet hooking. According to another embodiment, processing the service request with the first process comprises intercepting the service request using at least one of library interposition, network interface interposition, device-driver interposition, and a logical virtualized networking layer.

According to yet another embodiment, processing the service request with the second process is performed on at least one of a block level and a file system level. According to still another embodiment, processing the service request with the second process comprises intercepting the service request using at least one of library interposition, device-driver interposition, and file system interposition.

According to another aspect, a system is provided, the system including an application processor configured to execute an application adapted to process a service request; a request processor configured to receive a service request directed to the application and selectively provide the service request to the application processor; and a proxy processor, isolated from the application processor, configured to receive the service request from the request processor; process the service request with a first process responsive to the service request being a first request for the application to communicate over a network; process the service request with a second process responsive to the service request being a second request for the application to access a physical storage device; and responsive to a determination that the processed service request will not adversely affect the application, cause the request processor to provide the processed service request to the application processor.

According to one embodiment, the proxy server is further configured to process the service request with a third process responsive to the service request being a third request for the application to interact with a user interface device.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 1 is a block diagram showing a service-level entity protection architecture according to one embodiment of the present invention;

DETAILED DESCRIPTION

Figure 2A:
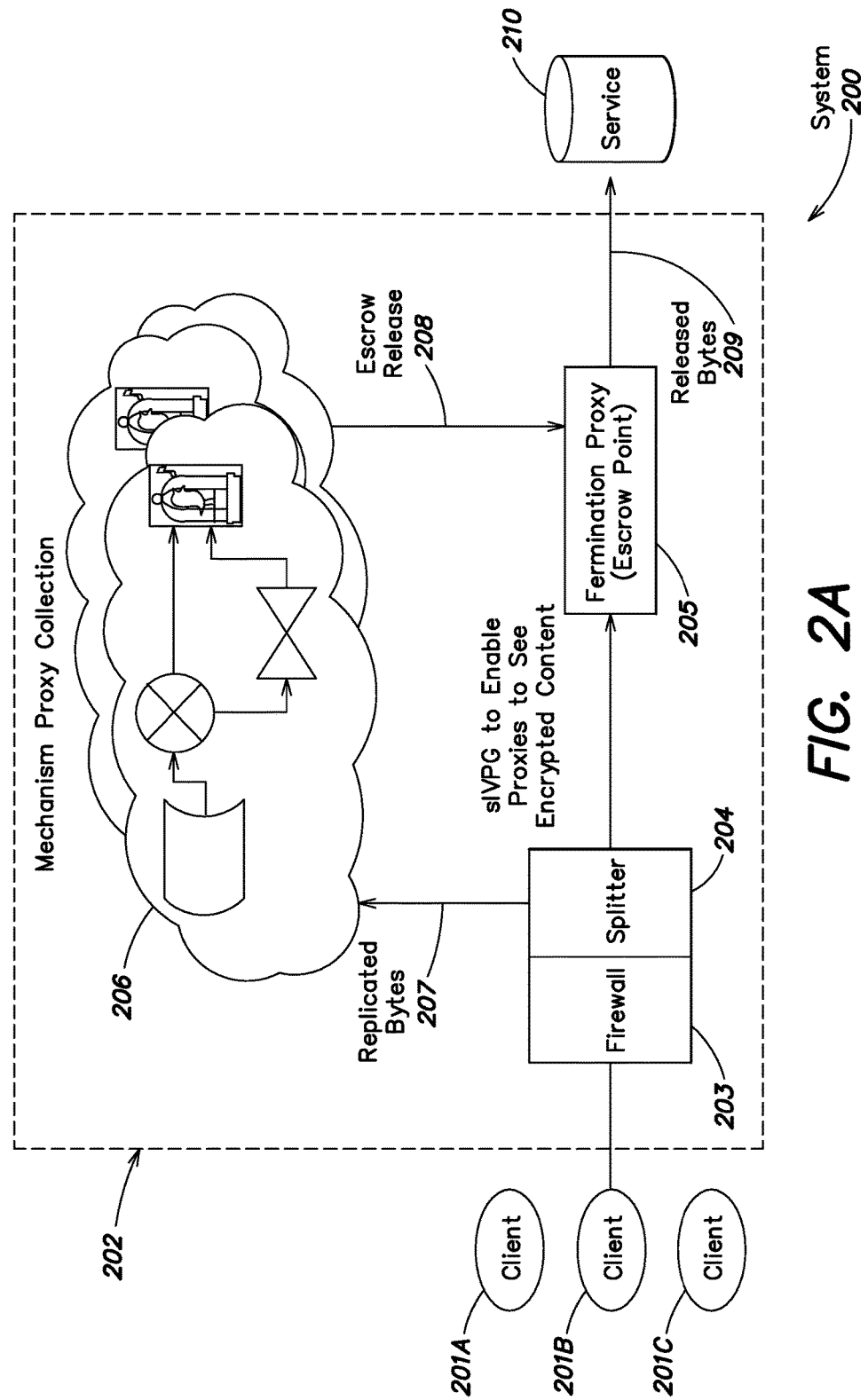
FIG. 2A shows a block diagram of another service-level entity protection architecture according to one embodiment of the present invention.

FIG. 1 shows a block diagram of a service-level entity protection architecture according to one embodiment of the present invention. In a distributed computer system architecture (e.g., system 100), a protection scheme may be provided that receives service requests (e.g., service request 102) originating from one or more entities (e.g., a client 101), and determines whether the service requests should be forwarded to a service-level entity (e.g., element 106).

In one embodiment, a service request processor (e.g., processor 104) may be provided that analyzes received service requests and determines whether the requests are "safe" and can be received by the service-level entity. It is appreciated that it may be beneficial to provide an interface that is accessed by other entities, and wherein the underlying service is not accessed directly. Elements of the protection architecture receive service requests, analyze them, and determine whether they can be safely executed by the underlying service-level entity.

According to one embodiment, the architecture includes a splitter entity 103 that receives a service request (e.g., service request 103) and sends a copy of the request to the service request processor (e.g., processor 104). The service request processor performs one or more analyses on the request, and determines whether the service request should be processed by the service-level entity.

In parallel to sending the request to the service request processor, the splitter sends a copy of the request to a memory where it is stored pending an outcome of the analysis by the service request processor. If it is determined that the service request should be processed by the service-level entity, the service request is sent to the service-level entity to be processed. In one embodiment, service requests may be escrowed in a memory (e.g., memory 105) and released to service-level entities as appropriate. The memory may include any number of devices or software constructs capable of storing one or more service requests. Requests (e.g., requests 107) may be arranged in a queue or list structure and may be released to the service-level entity in an order that the requests were received.

FIG. 2A shows another implementation of a service-level entity protection architecture according to one embodiment of the present invention. A crumple zone, or CZ (e.g., 202) may be provided that protects a service 210. The CZ, in one embodiment, may include a layer of intelligent service proxies that work together to present a high barrier to entry to an adversary, to increase the chance of detection of malicious activities, and to contain and recover from failures and undesired conditions caused by malicious attacks.

According to one embodiment, these proxies collectively implement the service's consumer-facing application programming interface. Different proxies may be used to help contain malicious activity by applying security checks and controls, then the proxies approve data for release if the request containing that data passes those checks. According to one implementation, only data that has been inspected and approved by one or more proxies is passed along to the service (e.g., service 210). Because the CZ inspects and processes untrusted data, the CZ may be permitted to fail occasionally. Automatic monitoring and restart of the proxies inside the CZ may also be provided.

The CZ may have one or more of the following features, including that the CZ should be non-bypassable. According to one embodiment, all consumer requests to the service are mediated through the CZ. In another implementation, the CZ responds to both known and unknown attacks. In yet another embodiment, the CZ is configurable by a user so that defenses can be tailored to the system's operational requirements and the potential threat environment. In yet another implementation, the CZ preserves the integrity of data that flows through the CZ to prevent man-in-the-middle scenarios run by corrupted CZ components.

To make the CZ non-bypassable, conventional network level protections such as firewalls and routers can be used. To make it difficult for adversaries to discover and access protected services, CZ may be adapted to present a very small exploitable surface to untrusted service consumers. This may be accomplished by placing the CZ behind a firewall (e.g., element 203) that uses single packet authorization (SPA). On the CZ side of the firewall, termination proxies (TPs) may be used as the entry point for all incoming client connections.

Varied and configurable defenses may be achieved through a set of proxies that implement specific checks and are organized in a mechanism proxy cloud or collection (MPC) (e.g., element 206). The MPC monitors observable behavior of requests. Proxies may be provided that check assertions on application data, e.g., by checking serialization fields, as well as canary proxies that consume application data and thereby absorb attacks, e.g., by crashing or getting corrupted.

To preserve data integrity within the CZ, service layer virtual private groups (slVPG) may be used. In one embodiment, a splitter component replicates Secure Sockets Layer (SSL) streams between clients and TPs to the MPC without breaking cryptographic envelopes. Key management components that are also part of the slVPG may selectively share keys from the TPs to the MPC so that new SSL streams can be decrypted for inspection.

FIG. 2A shows one or more clients 201A-201C that may initiate and send service requests to a service 210. The service requests may not be sent directly to the service 210, but rather, they may be sent to the CZ 202. CZ 202 may include a firewall 203 that may be configured to accept certain requests and to minimize the footprint of the requests that may be forwarded through the CZ. If a request passes through firewall 203, a splitter (e.g., element 204) makes a copy of the request along with any replicated bytes 207 and sends the request to the MPC (e.g., element 206). Also, the splitter 204 may send a copy of the request along with its content to a termination proxy (e.g., element 205). The termination proxy may serve as an escrow point at which service requests are escrowed until it is determined that they can be released.

In one embodiment, when the MPC 206 determines that a particular service request can be released, the MPC 206 sends an escrow release signal or message 208 to the termination proxy 205 instructing the proxy that the escrowed request should be released to the service 210. In one embodiment, it is realized that this architecture provides additional security in that if the proxy is compromised or crashed, the service request will not be released to the service 210.

Figure 2B:
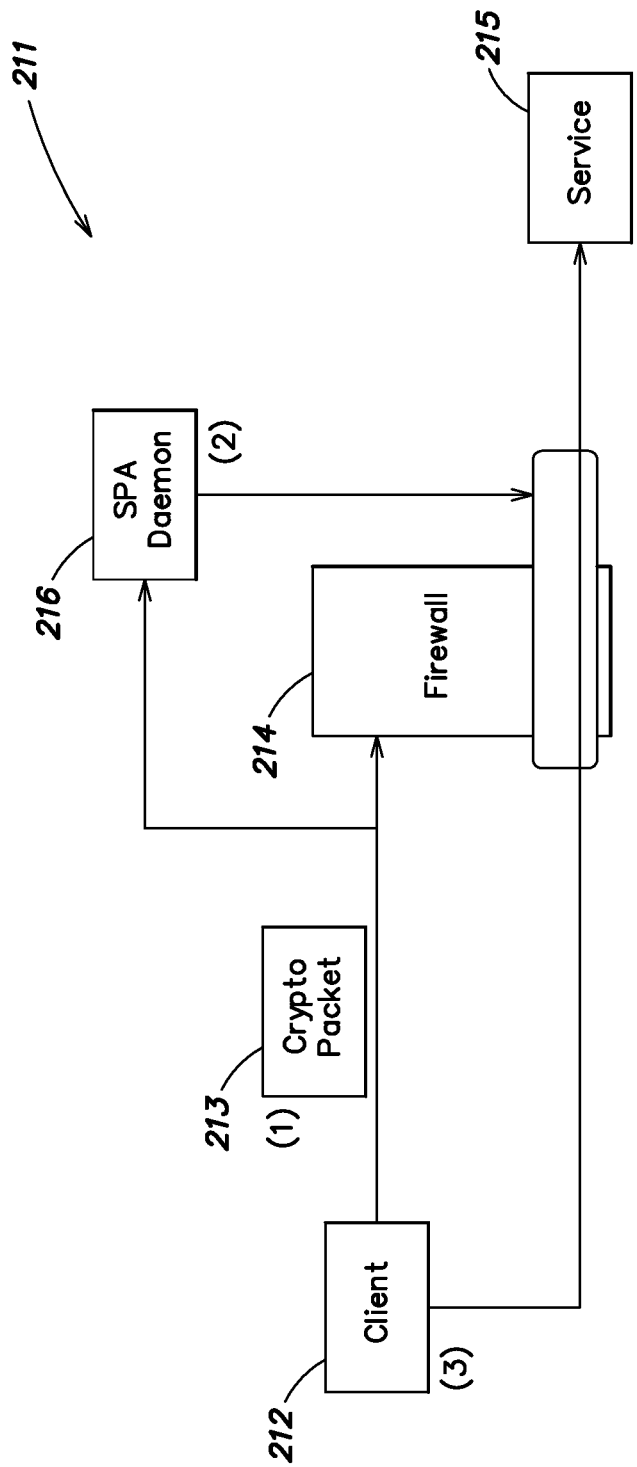
FIG. 2B shows a block diagram of a Single Packet Authorization (SPA) that might be used in accordance with one embodiment of the present invention.

As discussed, a firewall of the CZ is presented as a first layer of defense an attacker coming from the outside needs to overcome. In addition to standard restrictions on open ports and IP ranges, Single Packet Authorization (SPA) may be used to implement a least-privilege policy that allows access to listening ports only to authenticated clients. FIG. 2B illustrates generally SPA using a client 212 trying to access the service 215 through the firewall 214. The firewall 214 starts out by blocking all traffic to the service 215. A legitimate client 212 starts the interaction sequence in step (1) by sending a cryptographic-based credential that is encoded within a single packet (e.g., crypto packet 213) to the firewall 214. After verifying client identity and authorizing the client's connection request, a SPA server side component (e.g., SPA daemon 216) grants the client the right to establish a single Transmission Control Protocol (TCP) connection (for a limited amount of time) by adding specific firewall rules in step (2). Finally, the client establishes a normal TCP connection in step (3). A client without the proper credential is denied access.

SPA limits exposure of the protected enclave to port scans, remote OS fingerprinting, and low-level network stack exploits (such as TCP connection flooding). Port scan or OS fingerprinting attempts for reconnaissance may return no information unless the adversary has stolen or forged cryptographic credentials.

The splitter sends data to the MPC for analysis. As discussed, the system may implement a network level or an application level splitting of client traffic. The network level splitter copies the data at the firewall and forwards the data to the MPC with any encryption intact. In this embodiment, a decryption key for the client/server datastream is shared with the MPC. The application level splitter copies data in the termination proxy (TP) after the termination of the encryption (e.g., SSL) from a client. Data from the TP to the MPC remains encrypted to maintain data confidentiality.

As discussed above, there may be escrowed in a termination proxy (TP). In one embodiment, data is escrowed in the TP while the TP awaits approval to release the data to the service from the MPC. The TP may support one or more protocols, including but not limited to, HTTP/HTTPS for Web services (WS) and RMI for EJB. According to one embodiment, data may be escrowed in the TP in a separate circular buffer for each incoming client connection. To accommodate these protocols, the TP to execute a Web server to support HTTP/HTTPS and an RMI registry to support EJB.

For each client connection, there may be a socket connection from the MPC to the TP for approval and rejection messages. There may also be a socket connection from the splitter to the MPC for each client connection. These connections may be established from the TP to the MPC from the splitter to the MPC.

As long as there is space in the escrow buffer, the TP reads data from the client and adds the data to the buffer. If there is no space left in the buffer, the TP stops reading data from the client and the underlying network protocol slows down the data transmission rate from the client. According to one embodiment, the TP includes a timeout parameter that causes the TP to terminate the connection from a client connection if the TP is not received an approval from the MPC. Thus, according to one embodiment, if the escrow buffer is filled, and no approval messages from the MPC received (and approval message releases data, frees buffer space, and resets the timeout window), then the client data is rejected.

When the TP receives a new client connection, the TP determines which MPC or MPCs to conduct the analysis of the client data. This selection may be accomplished using components referred to herein as selectors. At a fundamental level, the selector components may maintain a list of possible target MPCs and select which one(s) to use for a particular connection. For instance, there may be more than one type of selectors (or schedulers). For instance, there may be a round-robin-type selector and a dispatch selector. The round-robin selector simply cycles through the MPCs in its list of MPC. The list of MPCs is created at configuration time (e.g., created from an XML file), but can be modified at runtime based on current needs and situation.

A dispatch selector may be used in conjunction with log analysis to separate incoming connections into two groups. The dispatch selector may contain two or more other selectors and selects which of those selectors will be asked to pick a MPC. For example, if an incoming connection's IP or subnet address matches what the dispatch selector is watching for, the dispatch selector uses one selector. If the address does not match, the dispatch selector uses the other selector.

In one embodiment, there may be one destination MPC, however, multiple MPCs may be returned. Selectors may implement a selector interface and a selector's configuration may be specified in a configuration file. The configuration file allows for specifying which MPCs should be used for each selector and in the case of a dispatch selector, the configuration file may specify two or more selectors to select from.

The TP may include a Key Manager (KM) component that starts up with the TP and works in concert with counterpart KM components residing at each MPC. When an SSL handshake is completed, the KM at the TP extracts the decryption key, and provides the key to the KM at the MPC that is chosen to host this client's proxy group. If the client-server messages are signed and encrypted at the application level, an additional level of key sharing is needed to make the decrypted data available for inspection and processing to the proxies.

Figure 21:
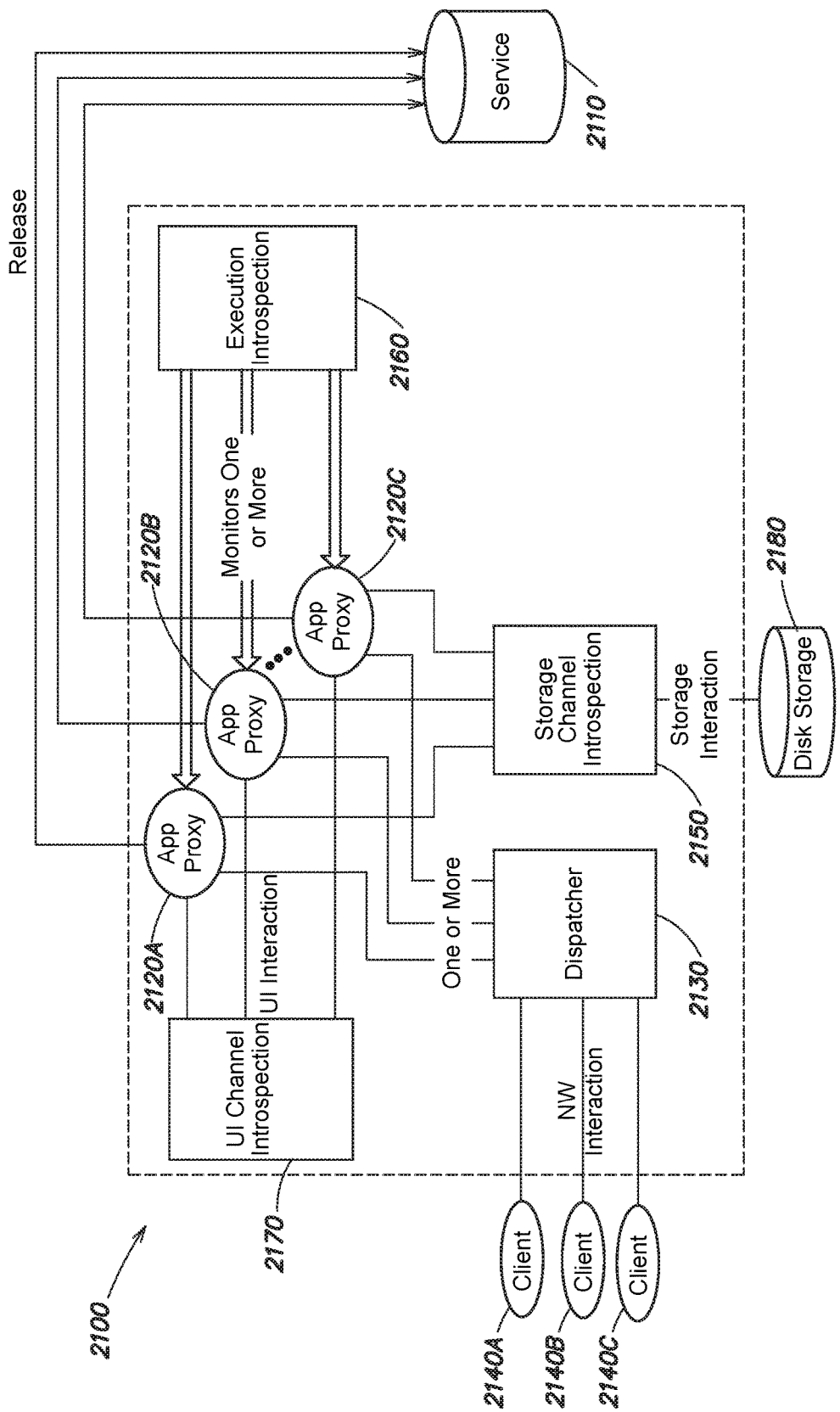
FIG. 21 shows a block diagram of another service-level entity protection architecture according to one embodiment of the present invention.

FIG. 21 shows an embodiment of a service-level entity protection architecture for processing requests directed to service 2110 according to one aspect of the present disclosure. System 2100 depicts system architecture similar to that shown in system 200 in FIG. 2A, and further includes a crumple zone implementation in which service requests are directed through channel-specific processes depending on the type of request (e.g., whether the request is a network request in a network channel, a storage request in a storage channel, or a user interface (UI) request in a UI channel). In particular, service requests that may present a security risk are not sent directly to the service 2110, but instead are intercepted by the system 2100 and directed to one or more proxies 2120A-C for the service 2110, where they requests are analyzed and/or modified.

Network interactions from clients 2140A-C and intended for one or more applications running as service 2110 may be intercepted by a network channel process 2130 that acts as a dispatcher of such requests by selectively directing the request to a particular proxy. Such network interactions may include requests for a response from the application, including a "ping" request to determine the status or identity of the application or service 2110. a request for resources (e.g., an HTTP "GET" request), a request to upload resources (e.g., an HTTP "POST" request), and a request to connect to the application (e.g., via a HTTP or FTP request). Network traffic may be intercepted by the system 2100 at various layers of the system, and data from any of a number of logical layers may be processed. For example, the system 2100 may enforce policies at the IP layer, Transport layer, and/or the Application layer. For example, the system 2100 may capture data at or near the application layer using library interposition. The system 2100 may also capture data at or near the network layer, using packet capture, packet hooking, or device driver interpositioning. The system 2100 may also capture data on virtual layers, such as a logical virtualized networking layer in the event the service is running in a virtual machine (VM) container.

Upon receiving a network interaction (i.e., service request) from one of the clients 2140A-C, the network channel process 2130 may direct the request to one or more of the proxies 2120A-C for further processing in a network channel configured to analyze and/or modify network requests. Each proxy 2120A-C may be configured to act as an emulator of the service or components thereof, such that the service request causes the proxy to behave exactly (or as nearly as possible) as the service would when executing the service request. For example, if the service 2110 is a web server, then the proxies 2120A-C when processing a network request may operate like a web server, such as by attempting to serve requested content to the clients 2140A-C.

Storage interactions may take place in response to processing that is triggered by network or user-interface interactions. In certain cases, physical actions such as inserting a removable media (e.g., a USB stick) may trigger some interaction with the application. The storage interactions may be triggered by the applications proxies (2120A-C), since these proxies interpose network and UI interactions.

Requests may be intercepted by a storage channel process 2150. Such storage interactions may include requests to read or write from memory, such as disk storage 2180. Storage requests may be intercepted by the storage channel process 2150 and/or the system 2100 generally at various levels of the system. For example, the system 2100 may enforce policies at the block level or the file system level. The system 2100 may capture data at or near the application layer using library interposition, file system interposition, or device-driver interposition. In addition, the storage channel process 2150 may intercept storage events intended for the application (2110), such as the insertion or availability of new media like a USB drive.

The storage channel process 2150 may ensure that a number of applications running on VMs are able to share disk resources by ensuring that requests to a particular application (e.g., service 2110) will not degrade the availability or performance of the storage, nor impair access by the other applications. For example, the storage channel process 2150 may evaluate storage requests to determine the amount of resources required by the request, either in terms of the amount of CPU/GPU consumed by the request, or the amount of disk space required by a write request. The storage channel process 2150 may also evaluate storage requests to determine if they are malicious by, for example, attempting to write to a boot sector or other unauthorized location of the disk.

User interface (UI) interactions intended for one or more applications running as service 2110 may be intercepted by a UI channel process 2170. The UI channel process 2170 is configured to process interactions between a UI device and one or more applications running as service 2110. Such interactions may include requests by the UI device to transmit its firmware to the application for installation, so that the UI device can be used with the application. Firmware may contain unstable code that causes the application to crash, or may contain intentionally malicious code such as viruses, security exploits, and the like. Such interactions may also include requests for information about keystrokes of a keyboard, or mouse or trackball movements, clicks, drags, or hovers, such as over graphical user interface elements. For example, the UI channel process 2170 can be configured to handle a request from an external application to access the current position or click events of a pointer (e.g., a mouse pointer). Such information can be used in a malicious manner to re-position user interface elements (e.g., pay-per-click ads) under a mouse pointer, causing the user to inadvertently click on undesirable elements, creating a security risk. Similarly, keystroke information can be logged by nefarious applications to obtain user identification, passwords, financial information, personally-identifiable information (PII), or the like.

The UI channel process 2170 may evaluate user interface requests to determine if they are malicious. For example, the content or performance of any firmware or other information may be examined to determine if it may be malicious. Where information about user interface interactions is requested, the identity of the requester or the nature of the information requested may be examined to determine if the information is likely to be used for malicious purposes.

User interface requests may be intercepted by the system 2100 at various levels of the system, and the UI channel process 2170 may be configured to process data from any of a number of logical layers. The UI channel process 2170 may enforce policies at the IP layer, Transport layer, and/or the Application layer. For example, the system 2100 may capture data at or near the application layer using library interposition. The system 2100 may also capture data at or near the network layer, or on a logical virtualized networking layer in the event the service is running in a virtual machine (VM) container.

Each of the channel processes 2130, 2150, 2170 may represent a pipeline that examines the static qualities of the requests they process, and may transform the requests in one or more ways. As each request is processed by the channel processes, a decision may be made regarding further processing to be performed on the request. Such decisions may include, for example, that the request may be malicious or cause an adverse effect on the service 2110, and should be prevented from reaching the service 2110; that the request should be passed directly to the service 2110; or that the request should be sent to the one of the proxies 2120A-C, for execution (e.g., by execution process 2160), and/or further inspection. This flow from the network channel process 2130, the storage channel process 2150, and/or the UI channel process 2170 to the proxies 2120A-C, and the additional processing performed subsequently, should be considered part of the respective "channels" for purposes of this disclosure.

Figure 22:
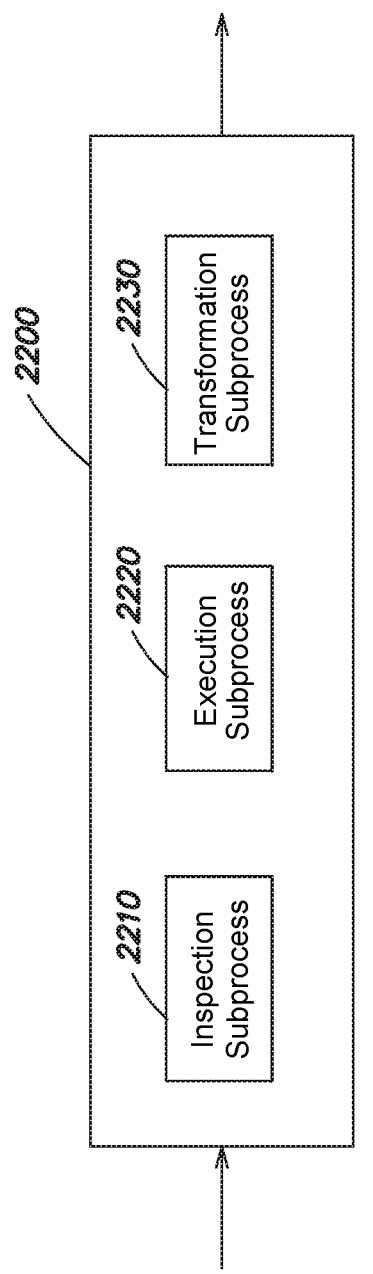
FIG. 22 shows a block diagram of a CZ implementation according to some embodiments.

An exemplary channel 2200 is shown in FIG. 22. The channel 2200 may represent any of the channel processes 2130, 2150, 2170, as well as subsequent processing performed by the proxies 2120A-C. While the channel processes 2130, 2150, 2170 are each configured to process different types of requests (i.e., network, storage, and UI), they may perform at least some of the same types of analyses or other functions on the requests they process, albeit possibly with different parameters, thresholds for determining malicious behavior, or the like. Other processes specific to each channel may also be performed.

Channel 2200 includes one or more processors configured to perform a number of processes, including an inspection subprocess 2210, an execution subprocess 2220, and a transformation subprocess 2230. While the examples described herein depict channels as sequential processes, one or more of the subprocesses 2210, 2220, and 2230 may be called in any order in a particular channel.

Inspection subprocess 2210 is configured to inspect generally static properties of a request, such as the protocol through which the request is made; the request syntax, header content, control payload content, data payload content, associated metadata, or other information, such as a source or target of the request, a size of the request and/or amount of requested information, the protocol or syntax of the request, or the like. According to some embodiments, the inspection subprocess 2210 may compare one or more of these static properties to a database of known malicious requests or properties thereof to determine if the request is malicious or potentially harmful to the service to which the request has been directed. For example, the inspection subprocess 2210 may compare a request to store a file with unique file signatures of known malicious files. The inspection subprocess 2210 may also compare static properties of the request to one or more threshold values to make the determination as to whether the request is potentially malicious or harmful. For example, an HTTP POST request that seeks to transmit information to the service at lower than a certain rate (such as 1 byte/110 seconds) may be deemed to be part of a denial of service (DoS) attack, and therefore malicious. In some embodiments, the inspection subprocess 2210 is trained with sample network traffic, using machine learning to develop a profile for identifying malicious requests.

The inspection subprocess 2210 may also store and compare aggregate static properties of one or more requests to determine whether the requests are part of a larger malicious campaign against the service. For example, a particular request may not appear malicious per se, but the fact that thousands of identical requests have been received from the same source in a relatively short period of time may suggest that the request is part of a malicious effort to overwhelm the service to disrupt or degrade service.

The execution subprocess 2220 is configured to inspect dynamic behavioral properties of the service request. Such dynamic properties can be initiated or revealed by executing the request or parts thereof, in whole or in part, in a controlled manner, isolated within the channel 2200, to avoid affecting the service (e.g., service 2110) should the request be malicious. In some embodiments, the execution subprocess 2220 acts as an emulator of the service (e.g., service 2110) or components thereof, such that the service request causes the emulator of the execution subprocess 2220 to behave exactly (or as nearly as possible) as the service would when executing the service request. In some embodiments, the request is only partially executed. In some embodiments, an execution process (e.g., execution process 2160 as shown in FIG. 21) is configured to interact with the emulator (e.g., proxy 2120A-C) to simulate passing the request to the emulator.

The resource usage (e.g., CPU/GPU) allocated to the request may be monitored to determine, for example, whether the service request will take up an inordinate amount of resources at the service. Execution event traces may also be performed to monitor the execution of the service request by the execution subprocess 2220.

The transformation subprocess 2230 is configured to modify or manipulate the service request based on certain criteria or rules enforced against requests to be processed by the service. For example, the transformation subprocess 2230 may modify or remove potentially malicious or malformed portions of the request. An unauthorized request to access a limited-access port of the service (e.g., a web server) may be modified to direct the request to an allowable port. In some embodiments, the request may be transformed to a different format. For example, the service may be configured to receive certain types of files (e.g., image files) in a certain format (e.g., JPG) as part of certain requests. A request that includes an image file in a different format (e.g., a SVG graphic image) may be converted to the expected format before the request is passed along to the service. As another example, a request that includes a malicious SQL command (e.g., one that may cause system instability or create security issues) may be modified to remove, disable, or otherwise counteract the malicious effect of the SQL command.

It will be appreciated that the inspection subprocess 2210, the execution subprocess 2220, and the transformation subprocess 2230 may each be called any number of times and in any sequence as dictated by the criteria for identifying malicious requests. Determinations made by one process may affect the steps performed by other processes. For example, the static characteristics of a service request may be analyzed by the inspection subprocess 2210 and, in response to a determination made on the basis of those static characteristics, the transformation subprocess 2230 may be executed to, for example, change a parameter of the request. The service request with the modified parameter may then be re-examined by the inspection subprocess 2210.

Furthermore, different configurations and functions of the inspection subprocess 2210, the execution subprocess 2220, and the transformation subprocess 2230 may be applied depending on the origin of the service request. For example, a service request from a trusted server (e.g., in a related system) may be subjected to a lower level of scrutiny than a service request from an unknown entity over the Internet. The level of scrutiny and analysis for requests from particular sources may be adjusted over time. For example, an unknown entity initially subject to higher scrutiny may become "trusted" after a certain period of time or number of requests has passed without the entity becoming a security threat; the entity may be considered trusted (or some higher level of trust) and subject to lower scrutiny.

Referring again to FIG. 21, the channel processes 2130, 2150, 2170 may be isolated in memory and communication from one another, such that if the function of one is impeded or degraded, the other channels may continue to operate normally. For example, each channel may be implemented on a separate and isolated VM. Furthermore, while the illustrations here include one example of each of the channel processes 2130, 2150, 2170 for purposes of simplicity, it will be appreciated that any number and configuration of channel processes 2130, 2150, 2170 may be implemented and/or modified depending on actual or anticipated need. The number of particular types of channel processes 2130, 2150, 2170 may be increased or decreased according to application, volume, processing requirements, and the like. In one example, a server application running as a service (e.g., service 2110) may require a relatively high number of network channel processes 2130, some number of storage channel processes 2150, and no UI channel processes 2170.

In some embodiments, load balancing or traffic management techniques may be employed to deploy and re-deploy channels as needed. To continue the example of the server application just discussed, during times of high disk activity (such as a surge in downloads of large files) additional storage channel processes 2150 may be employed to keep up with demand. The additional storage channel processes 2150 may be added as new VMs, for example, or some number of network channel processes 2130 may be reconfigured and re-deployed as storage channel processes 2150, either on a temporary basis for a certain amount of time, or until the usage profile of the server application requires yet another reconfiguration.

Only requests or data that have been inspected, transformed, and/or approved by one or more of the channel processes 2130, 2150, 2170 are passed along to service 2110. Furthermore, because the channel processes inspect and process untrusted data, any channel process may be permitted to fail occasionally. Automatic monitoring and restart of the channel processes may also be provided.

In some embodiments, a request may be escrowed in a data store until it is determined that it can be released. In one embodiment, when a channel process 2130, 2150, 2170 determines that a particular service request can be released, the channel process 2130, 2150, 2170 sends an escrow release signal or message 2108 to the data store instructing the proxy that the escrowed request should be released to the service 2110. Such an architecture provides additional security in that if a proxy 2120A-C is compromised or crashed, the service request will not be released to the service 2110. Alternatively, a channel process 2130, 2150, 2170 may transmit the processed request, including a modified version thereof, directly to the service 2110 upon determining that it is safe to do so.

Figure 23:
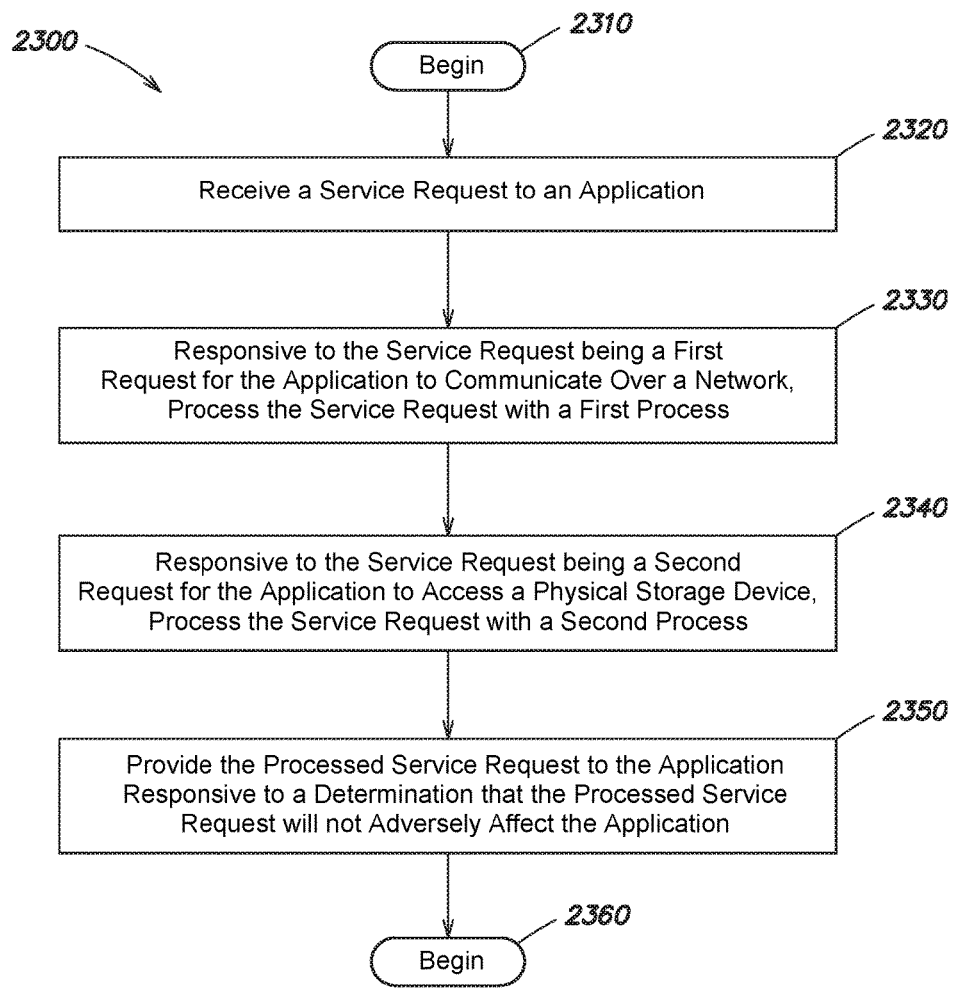
FIG. 23 shows a method for performing security functions in a computer system hosting a network-facing server application according to some embodiments.

A method 2300 for performing security functions in a computer system (e.g., system 2100) hosting a network-facing server application according to some embodiments is shown in FIG. 23.

At step 2310, the method begins.

At step 2320, a service request to an application adapted to process the service request is received by a service request processor. The service request may originate from one or more clients outside the system and connected by a network (e.g., the Internet), or may originate from other entities within a larger network trusted by the system. The service request processor may comprise a firewall, splitter, or other component within the system configured to intercept such requests, which are prevented from reaching the application directly.

At step 2330, responsive to the service request being a first request for the application to communicate over a network, the service request is processed with a first process isolated in memory from the application, and at step 2340, responsive to the service request being a second request for the application to access a physical storage device, the service request is processed with a second process isolated in memory from the application. For example, if the request is a network request (e.g., a request for a connection from a client), the request may be directed to a first process; on the other hand, if the request is a storage request (e.g., a request to upload data to the application), the request may instead be directed to a second process.

The splitter or other component may be configured to assess the service request to determine the type of request. As discussed above, in some embodiments, requests may be directed to an appropriate channel process based solely on how they are formatted or addressed. In other embodiments, requests may be examined more closely to confirm their type. For example, the headers and/or payload of a packet in what appears to be a network request may be examined to confirm that the request is, in fact, a network request before the request is passed along to the network channel process.

The first process or the second process may process the request as described elsewhere herein. In particular, as part of the first process or the second process, one or more inspection subprocesses, execution subprocesses, and/or transformation subprocesses may be applied to the request. The inspection subprocess may inspect static properties of a request, such as the protocol through which the request is made; the request syntax, header content, payload content, associated metadata, or other information, such as a source or target of the request, a size of the request and/or amount of requested information, or the like.

The inspection subprocess may compare one or more of these static properties to a database of known malicious requests or properties thereof to determine if the request is malicious or potentially harmful to the service to which the request has been directed. The inspection subprocess may also compare static properties of the request to one or more threshold values to make the determination as to whether the request is potentially malicious or harmful. The inspection subprocess may also store and compare aggregate static properties of one or more requests to determine whether the requests are part of a larger malicious campaign against the service, such as one involving multiple requests intended to overwhelm the service to disrupt or degrade service.

The execution subprocess is configured to inspect dynamic behavioral properties of the service request. Such dynamic properties can be initiated or revealed by executing the request or parts thereof in a controlled manner, isolated within memory, to avoid affecting the service (e.g., service 2110) should the request be malicious. In some embodiments, the execution subprocess acts as an emulator of the service or components thereof, such that the service request causes the emulator of the execution subprocess to behave exactly (or as nearly as possible) as the service would when executing the service request. The resource usage (e.g., CPU/GPU) may be monitored to determine, for example, whether the service request will take up an inordinate amount of resources at the service. Execution event traces may also be performed to monitor the execution of the service request by the execution subprocess.

The transformation subprocess is configured to modify or manipulate the service request based on certain criteria or rules enforced against requests to be processed by the service, such as by modifying or removing potentially malicious or malformed portions of the request. In some embodiments, the request may be transformed to a different format.

The first process may be configured to process network requests using the subprocesses described above. Such network requests may include requests for a response from the application, including a "ping" request to determine the status or identity of the application or service, a request for resources, a request to upload resources, and a request to connect to the application. Network traffic may be intercepted on any of a number of logical layers or virtual layers, including the IP layer, the Transport layer, and/or the Application layer. Data may be captured using library interposition, packet capture, packet hooking, device driver interpositioning, or the like.

The second process may be configured to process storage requests using the subprocesses described above. Such storage requests may include requests to read or write from memory, such as a hard disk. The second process may evaluate storage requests to determine the amount of resources required by the request, either in terms of the amount of CPU/GPU consumed by the request, or the amount of disk space required by a write request. The second process may also evaluate storage requests to determine if they are malicious by, for example, determining whether the request is attempting to write to a boot sector or other unauthorized location of the disk, is attempting to write certain unauthorized strings or other content, or violates defined limits on the size and/or frequency of storage requests.

Storage requests may be intercepted at various levels of the system, and policies may be enforced at the block level or the file system level, and may be captured using library interposition, file system interposition, or device-driver interposition.

An optional third process may be configured to process interactions between a user interface (UI) device and one or more applications using the subprocesses described above. User interface requests may be evaluated to determine if they are malicious. For example, the content or performance of any firmware or other information associated with the device may be examined to determine if it is malicious. Where information about user interface interactions is requested, the identity of the requester or the nature of the information requested may be examined to determine if the information is likely to be used for malicious purposes.

User interface requests may be intercepted at various levels of the system, including the IP layer, the Transport layer, and/or the Application layer. Data may be captured using library interposition.

At step 2350, responsive to a determination that the processed service request will not adversely affect the application, the processed service request is provided to the application. In some embodiments, an unmodified or modified version of the request may be transmitted to the application directly by one of the first, second, or third processes. In other embodiments, the first, second, or third process may send an instruction to release the originally received request, which may be held in escrow while the first, second, and/or third processes are performed. On the other hand, if the request is found to be malicious, the request is withheld from the service, and may continue to be held in escrow for further processing or study, or may be deleted or otherwise removed from the system. Information about the request, whether it is determined to be malicious or non-malicious, may be logged in a database.

Method 2300 ends at step 2360.

Figure 3:
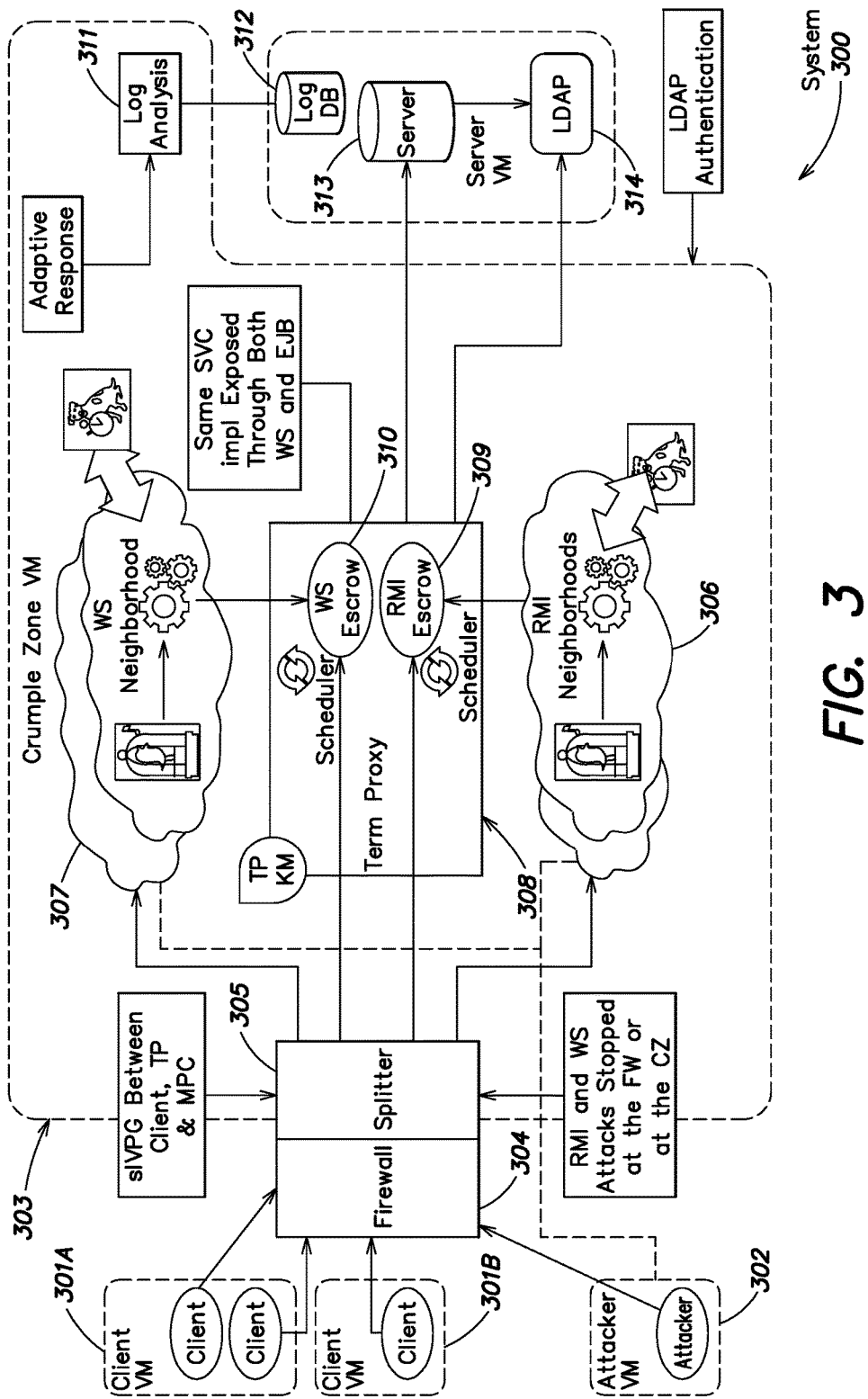
FIG. 3 shows a block diagram of another service-level entity protection architecture according to one embodiment of the present invention.

FIG. 3 shows one embodiment of another service-level entity protection architecture according to one embodiment of the present invention. In one embodiment, system 300 includes a crumple zone 303 that executes on a virtual machine. One or more client VMs (e.g., 301A-301B) are capable of using one or more services being protected by CZ 303. In one example, an attacker VM 302 attempts to access the system via firewall 304.

CZ 303 includes one or more MPCs 306, 307 that are adapted to analyze incoming service requests. As discussed, the MPC may include a loosely-coupled set of proxies that perform checks on application data. According to one embodiment, an MPC may have a hierarchical structure. In one implementation, located at the bottom of the hierarchy are individual mechanism proxies (MPs) implementing check functionality, the next level up include proxy groups (PGs), and at the top of the hierarchy, neighborhoods are defined.

MPs inspect the content of the incoming traffic for attacks. For example, a rate proxy may raise a flag if the session has an unusually high message rate. Similarly, a size proxy may reject a message having huge user data that exceeds a certain size. Such proxies are useful for detecting known attacks, i.e., high message rate leading to denial of service, and big objects leading to heap overflow.

To protect against novel attacks, MPs may be used that simulate the behavior of the protected service. If the simulated behavior is close enough to the actual behavior the effects of the novel attack can then be detected, absorbed, and managed by the proxy. What is referred to herein as a "canary" proxy is an example based on this technique. Like the historical "canary in a coalmine," a canary proxy may emulate the protected service and this proxy is affected by the attack in the same way the protected entity would. In one embodiment, the canary proxy is configured to parse the incoming stream the same way the service would thus protecting the deployed service against attacks that might be caused by arbitrarily malformed streams or arbitrary attack commands encoded in serialized data (for example, serialized instances of Java classes).

PGs represent a coordinated collection of MPs that together perform checks on application traffic. PGs are associated with SSL connections; each SSL connection between clients and TPs will be forwarded (through the slVPG) to a dedicated PG. According to one embodiment, this assignment can be controlled at runtime based on available resources. The proxies within a group coordinate with a group controller (one controller per group), which regulates the control flow between the proxies in the group. According to one embodiment, the group controller may enforce an order of execution on the proxies for improved protection. For example, to prevent unnecessary deaths of the canary proxy, a blacklist proxy may be positioned before the canary in a serial manner, and the blacklist proxy may be configured to screen for instances of known malicious classes. Other arrangements of execution order may be arranged by the controller, user, system or process. Further, according to one embodiment, group controller may be provided that is responsible for communicating with the TP to notify of the number of bytes cleared by all of the proxies in the group.

According to one embodiment, proxies may be provided for different classes of service requests such as, for example, Web Services (WS) or Remote Method Invocation (RMI) requests, among other types. For instance, an MPC 307 may be provided that includes proxies that inspect WS requests, and an MPC 306 may be provided that inspects RMI requests. Similarly, termination proxy 308 may include request escrows associated with different types of requests (e.g., WS escrow 310, RMI escrow 309, etc.).

In another embodiment, the architecture may support Lightweight Directory Access Protocol (LDAP) requests. As is known, LDAP is commonly used to manage and access directory information. Rather than send LDAP requests directly to a server (and service), such requests may be received and analyzed by the CZ.

In yet another embodiment, CZ 303 may include a database log (e.g., element 312) that stores entries associated with service request processing. In particular, log messages may be sent from various components of the CZ which are stored in the database log. CZ 303 may also include a log analysis processor that analyzes log entries and takes certain actions, such as, for example, sending commands to various component of the CZ to adaptively respond to attacks.

Figure 4:
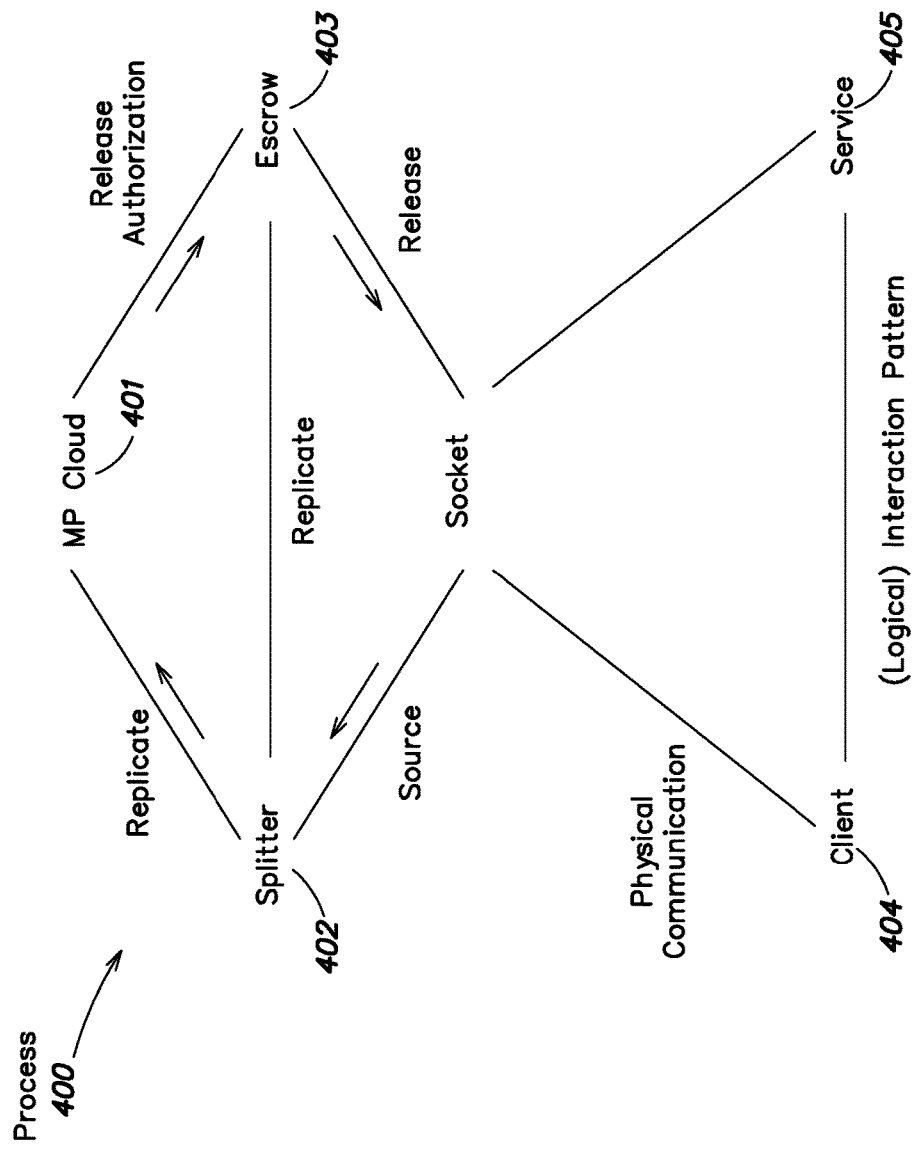
FIG. 4 shows a process performed by a service-level entity protection architecture according to one embodiment of the present invention.

FIG. 4 shows a control model that may be implemented in various protection architectures discussed above. According to one aspect, given the emphasis on ensuring the survivability of the service, the basic operating model of survivability architecture may include control of the interaction between the client and the service so that good clients can do the things they want to do and bad clients cannot do bad things to services or to the interactions good clients have with services. Note that the architecture may not protect good clients from attacks as, according to one embodiment, the architecture does not exert any control over the execution or communication environment of the client.

The basic control model shown in FIG. 4 can be explained as follows. The logical interaction between the client and service involves actual communication between the client and a server or other entity providing the service. This communication takes place over a network with at least a notional socket or IP based protocol. To exert control, the traffic is intercepted. A variety of mechanisms may be used for intercepting and controlling the interaction.

According to one embodiment, controlling the traffic flowing between the client (e.g., client 404) and service (e.g., service 405) provided by the server or other entity includes escrowing the traffic, and releasing the traffic to the service only after it can be reasonably ascertained that the traffic is not going to harm the service. Ascertaining that the traffic is safe to release involves examining the traffic. The client and service implementations dictate the specifics of traffic involved in the interaction such as the wire protocol (e.g., RMI or HTTP) involved, as well as potential mechanisms for message integrity, authentication, and service model (request response, publish subscribe, one way, etc.). Consequently, the examination mechanism and techniques can be customized for a specific client-server implementation and service model.

In FIG. 4, MP cloud 401 represents the examination process. Note that the separation between MP cloud 401 and escrow 403 implies a separation between controlled release and the actual scrutiny and examination of the traffic flow. MP cloud 401 and escrow 403 are provided with distinct copies of the interaction stream. This may be accomplished as discussed above by using a splitter (e.g., splitter 402) for the client data—different implementations are possible for such splitting and replication each with different security and performance implications. The escrow mechanism may include a buffer where data from the communication between the client and the server is held until inspection is performed. The buffer is managed in a way allowing parts of the buffer to be forwarded to the recipient as soon as the inspection process approves the data.

There are a number of benefits why the basic control model may, according to one embodiment, separate the actual task of examining the traffic from the escrow (release control). Processes examining the traffic may fail handling suspicious content. Isolating examination from release control allows more flexibility in configuring both mechanisms. With such separation, the containment boundaries for the two (examination and control) do not need to span the same set of clients—implying that a bad client killing the examination function does not necessarily affect all clients whose traffic are being controlled by the escrow function. Further, separating the examination and release control functions makes the implementations somewhat easier to analyze. In addition, one of the candidate designs for the escrow mechanism involves embedding the escrow function in the application server. If the examination functions are also in the application server, it is harder to isolate the service from failures in the inspection process. Note that separating the examination and release control function does not save or increase encryption and marshalling costs.

According to one embodiment, the escrow function operates on unencrypted data similar to the inspection processes because the control messages from the inspection processes are performed in terms of the byte count on the unencrypted stream. The escrow function may decrypt before performing approval processing and reencrypt the stream before sending approved data to the server. Not all mechanism proxies necessarily unmarshal the application level data and a separate stream could be provided in the inspection layer.

Note that the basic control model shown in FIG. 4 adds a number of defense-focused elements to the operational model. The survivability architecture may make sure the modified model is robust because the newly added elements and/or the changes caused by the addition may introduce new vulnerabilities into existing system components because of the increase in software complexity, and become the target of an attack.

Figure 5:
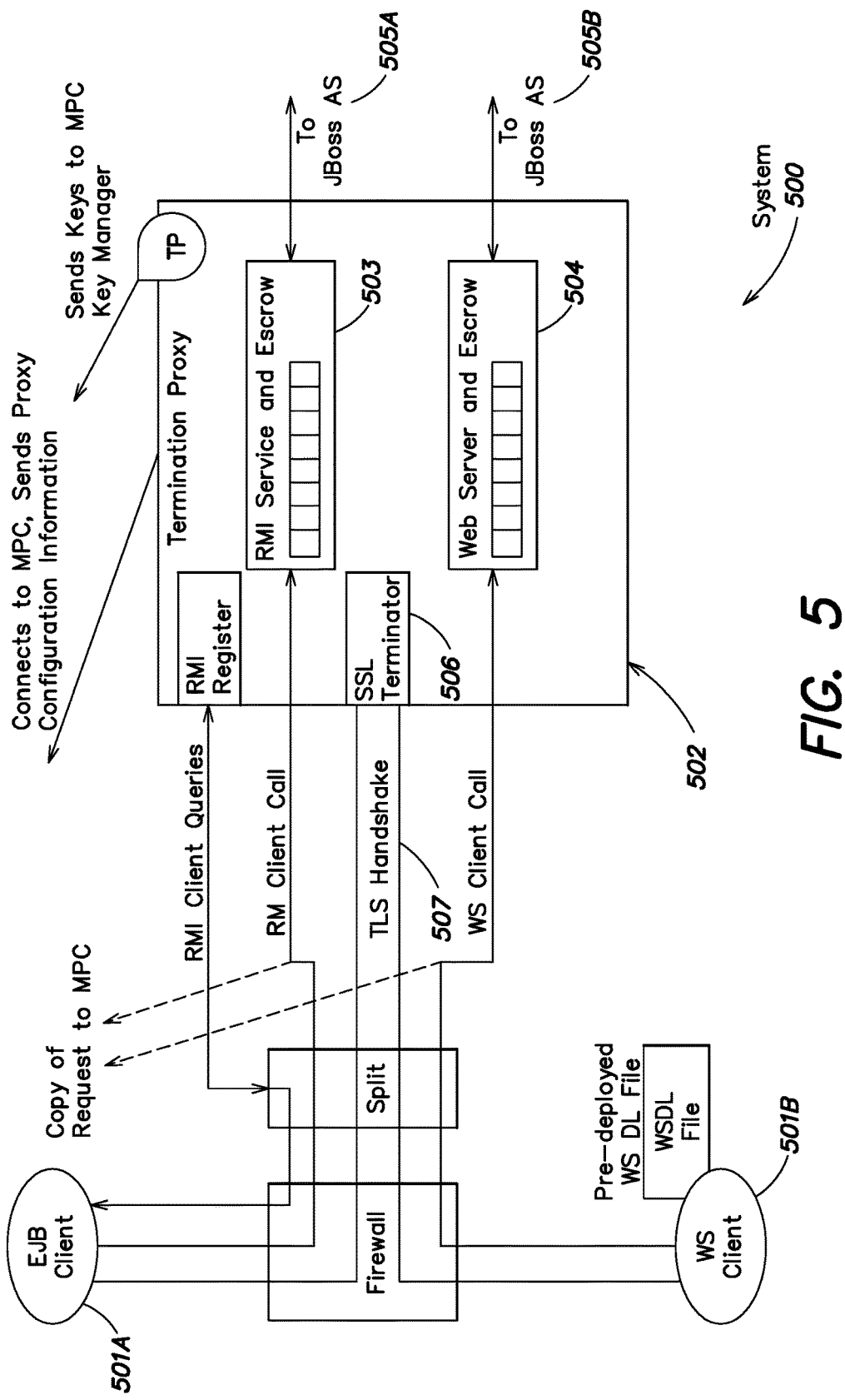
FIG. 5 shows another process performed by a service-level entity protection architecture according to one embodiment of the present invention.

FIG. 5 shows another process performed by a service-level entity protection architecture according to one embodiment of the present invention. In particular, FIG. 5 shows a system architecture that permits both WS and EJB clients (e.g., EJB client 501A, WS client 501B) access to a service with a network-level splitter using SSL. A termination proxy (TP) 502 may include termination proxies for different services.

An RMI client query may be received and directed to an RMI registry component in TP 502 which handles any responses to the client (e.g., in lieu of the service). The client (e.g., 501A) may perform an RMI client call which a copy is sent to the MPC, and another copy is sent to an RMI service and escrow 503. If released by the MPC, the client call is sent to a JBoss AS 505A.

In the case of a WS client call, a WS client may send a WS client call to a separate Web server and escrow 504 used for WS clients. Once released by the MPC, the WS client call may be sent to a JBoss AS 505B.

Figure 6A:
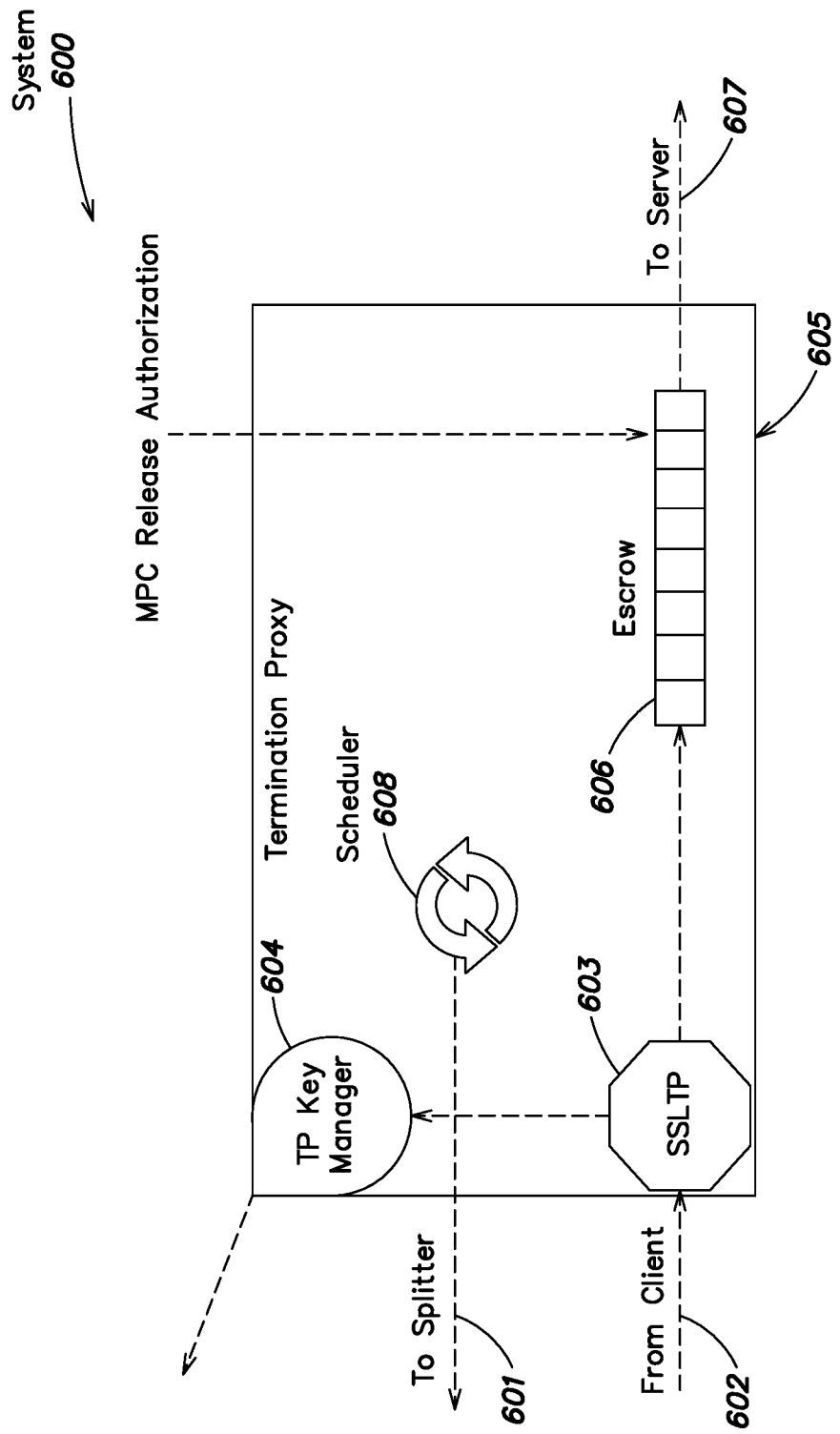
FIG. 6A shows one implementation of a termination proxy (TP) according to one embodiment of the present invention.

FIG. 6A shows one implementation of a Termination Proxy (TP) 605 in accordance with one embodiment of the present invention. As discussed above, Termination Proxies (TPs) are advertised as service endpoints for the client, while according to one embodiment, the actual service is accessible only from the TP. From the perspective of the client, the client "believes" it is connecting directly to the service, but the TP provides a barrier between the service and the client. The TP escrows client-server data until it is analyzed and determined to be safe to release.

SSL Termination Point (SSLTP) 603 receives a request 602 from a client, and sends a copy to a TP Key Manager 604 which decrypts the request. As shown, FIG. 6A uses a network-level splitter that splits the data before the data reaches the TP. TP 605 includes a scheduler 608 that communicates with a splitter 601. Notably, in FIG. 6A, network level splitting occurs and thus splitting is not performed at TP 605. Also, a copy of the encrypted request is sent to escrow 606, after which the request may be released to the service (and associated server or other entity 607).

In one design implementation, the TV s logic is minimized to make the TP less prone to exploits. For this reason, one implementation of the TP does not permit the TP to itself analyze any client data because the analysis process might introduce corruption or crash failures. Instead, according to one embodiment, data analysis is performed in the MPC. If traffic passes all checks, the MPC sends one or more authorization messages to the TP stating how many bytes of client data have been approved for release.

According to one implementation, the TP requires active approval of client data by the MPC within a certain amount of time. If the MPC detects anything wrong with the data or if the MPC fails to send a timely approval message, the connection to the client is closed by the TP and the escrowed data is discarded. Alternatively, when the MPC approves a certain number of bytes for release, the TP releases that amount of data from escrow and sends the data to the service. One benefit of the split check-escrow model is that corrupted nodes in the MPC cannot directly affect the integrity of the application stream because, according to one embodiment, MPC nodes only operate on a copy of the data and cannot alter the data that is released from the escrow buffer of the TP. On the other hand, corrupted nodes in the MPC can incorrectly approve or disapprove release of escrowed data because the TP only receives instructions to release a certain number of bytes. This issue may be dealt by using voting on a release instruction among more than one TP.

Crashes in the MPC prevent approval messages from reaching the TP, which then results in the TP closing the connection to the client. According to one embodiment, all incoming client connections are routed through the TP—if the TP were to crash, many client connections would be terminated. Isolating possible crashes in the MPC limits the number of clients affected by any crashes. According to one embodiment, watchdogs may be used to help the TP and other system components recover from crashes.

A single TP may be a single-point-of-failure in the CZ. This can be addressed, for example, by incorporating multiple TPs in the CZ, deployed in a manner similar to load balancing. This parallel implementation of multiple TPs provides isolation and replication to this critical part of the CZ. Additionally, in conjunction with the watchdog for a TP, TPs can be moved and restarted to provide additional fault tolerance.

According to one embodiment, the TP is implemented inside a Java InputStream. Within an InputStream abstraction, data is escrowed and MPC communication occurs. This abstraction allows the TP to be used easily in a variety of situations. For instance, the TP InputStream can be inserted into a SocketFactory that allows it to be used for RMIIEJB interactions. The TP InputStream can also be inserted into a web server and used to support WS/HTTPS connections. It is appreciated that any connection that presents an InputStream abstraction can be easily integrated with the TP and the whole CZ.

Figure 6B:
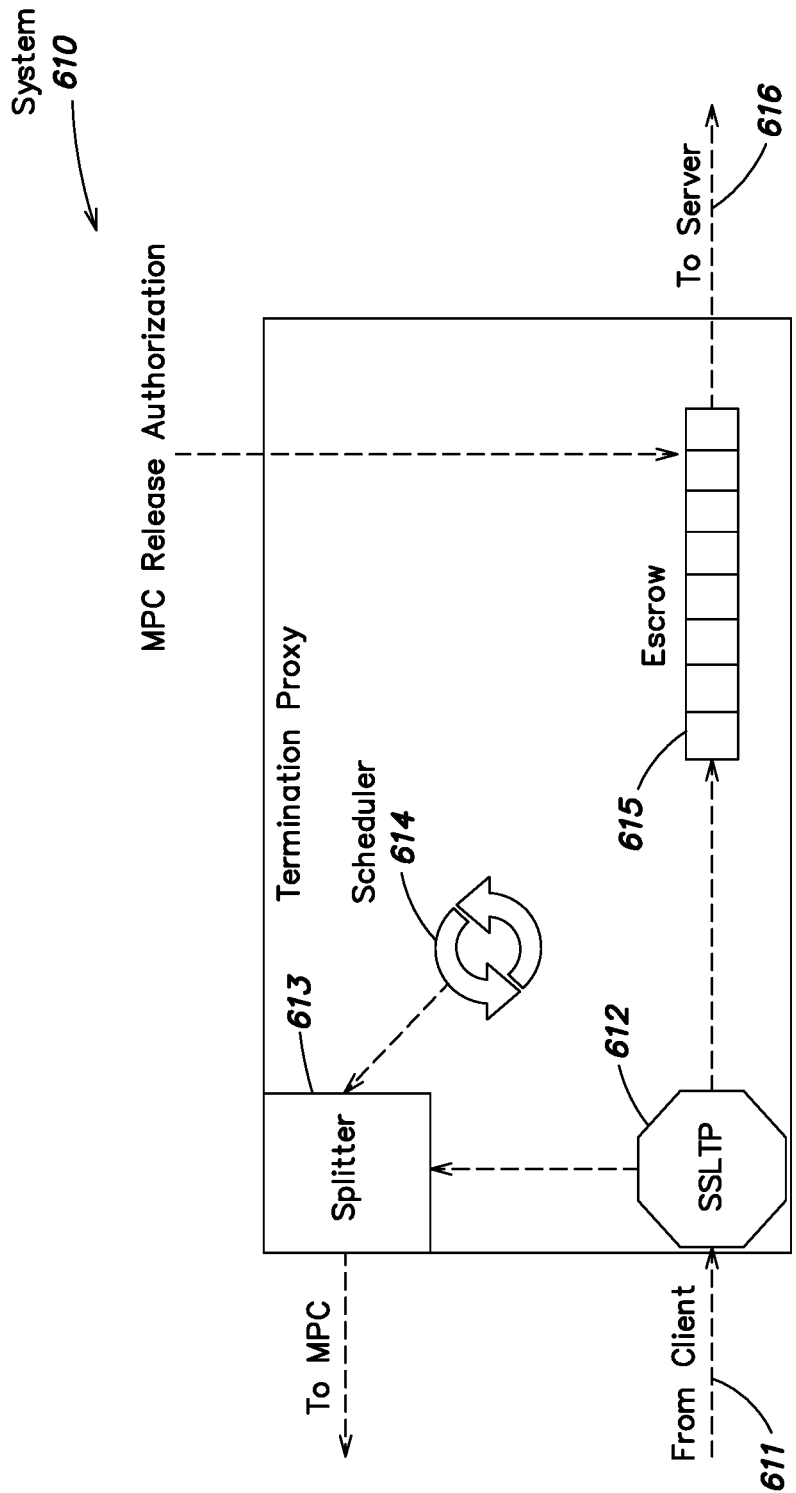
FIG. 6B shows another implementation of a termination proxy (TP) according to one embodiment of the present invention.

As discussed above, according to one embodiment data from the client is split and set to both the TP and the MPCs. This split can be accomplished by a component in the firewall or by splitting the data once it reaches the TP (e.g., as shown in FIG. 6B). In different circumstances one configuration or the other might be more desirable. The network level splitter may be determined to be more secure as the data is split before it reaches the TP—in other words, data is distributed in encrypted form, whereas if the TP distributes the data, the data is distributed after decryption. Note that the TP may use SSL connections to distribute the data, which will provide similar level of security but will incur additional setup cost, and makes the TP an even more critical component.

In the case where the system uses network level splitting, the TP holds the data that gets released, but does not control what the MPs see, which in the presence of appropriate audit trails makes it easier to detect if the TP is corrupt or malfunctioning. If the splitting is done at the TP, the TP controls both. If the data that is being processed is not coming from the network, the TP may need to split the data itself (for example, reading data from a file). FIG. 6A shows the TP with a network level splitter, and FIG. 6B shows the TP with an application level splitter integrated into the TP.

In particular, FIG. 6B shows a termination proxy in a distributed system 610. In particular, a request 611 is received from a client directed to an SSLTP 612. One copy is sent to splitter 613 located within the termination proxy, which forwards a copy to the MPC. The TP includes a scheduler that communicates with splitter 613. SSLTP 612 also forwards a copy of the request to the escrow 615. After receiving a release authorization from the MPC, the request is released to the server 616 (and service).

According to one embodiment, after the data arrives at the TP, the data is placed into an escrow buffer. When approval messages are received from the MPC, escrowed bytes are authorized for release. According to one embodiment, data insertion happens in one thread, a separate thread provides the data to actual server, and a third thread processes messages from the MPC.

In the case of encrypted data and a network level splitter, the TP (e.g., TP 605) shares the encryption keys with the MPC. If the TP is doing the splitting, the TP sends the data after the data is decrypted to the MPC using SSL. (The data sent to the MPC is encrypted in either case—in one case, the data is encrypted by the client, in the other, the data is re-encrypted by the TP.)

The network stack at the server processes the data bytes released by the TP, and eventually the server executes the service requests and returns a response. The response can be returned directly to the originating client, or the response can be processed through the CZ. For the case when the CZ processes the response, the service-to-client path looks similar to the client-to-server path: the TP escrows the response, while the MPs process the response, and when the MPs approve the response, the TP releases the response to the actual client. Because the client's SSL connection is terminated at the TP, the response path also follows a similar pattern—i.e., the SSL connection used to send the response back to the client is established between the client and the TP.

The TP uses various schedulers to determine which MP neighborhoods should be used for a particular client connection. These schedulers may range from a simple round-robin scheduler to more complex schedulers that take into account the history of the client connections to assign new connections to a high or low risk MPC. The sophistication of the scheduling depends on the level of redundant resources available in the MPC to host MP neighborhood, what directives or constraints the conglomerate management functions have issued.

Figure 7:
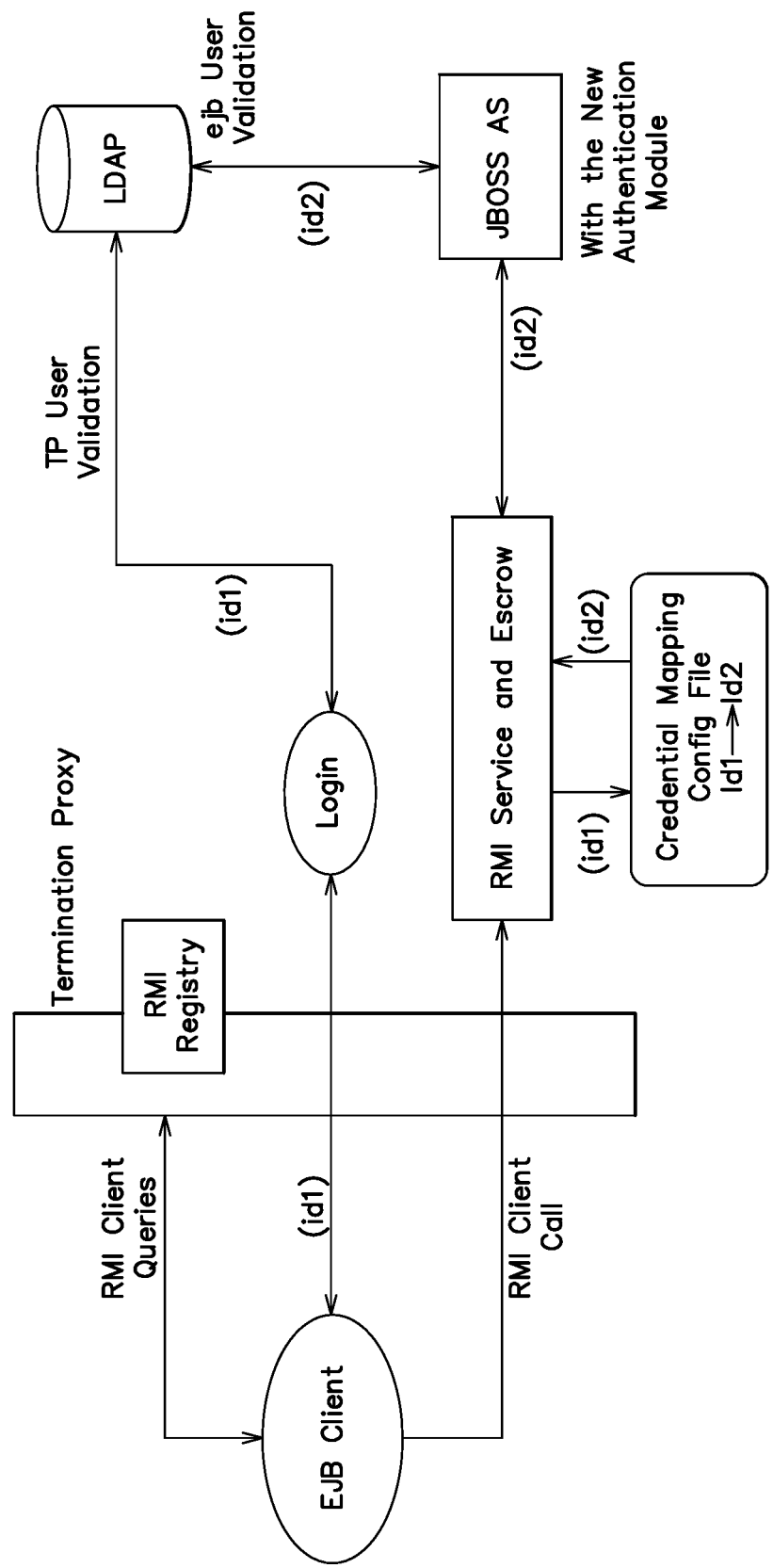
FIG. 7 shows a more detailed implementation of a Remote Method Invocation (RMI) according to one embodiment of the present invention.

FIG. 7 shows a more detailed implementation of a Remote Method Invocation (RMI) call in processing in accordance with one embodiment of the present invention. In particular, an EJB client may be capable of generating RMI client queries to an RMI registry and generating one or more RMI client calls to an RMI service. According to one embodiment, the termination proxy performs RMI registry lookups to determine whether a particular EJB client is validated. For instance, the termination proxy may receive the RMI request and present the external interface to the EJB client. A user validation procedure performed in the termination proxy may access one or more LDAP databases to determine whether the user is validated. If validated, the EJB client may be permitted to login and perform one or more RMI client calls. Such calls may be reviewed and sent through an RMI service and escrow. Requests, when released may be forwarded to an application server (e.g., a JBoss AS).

Figure 8:
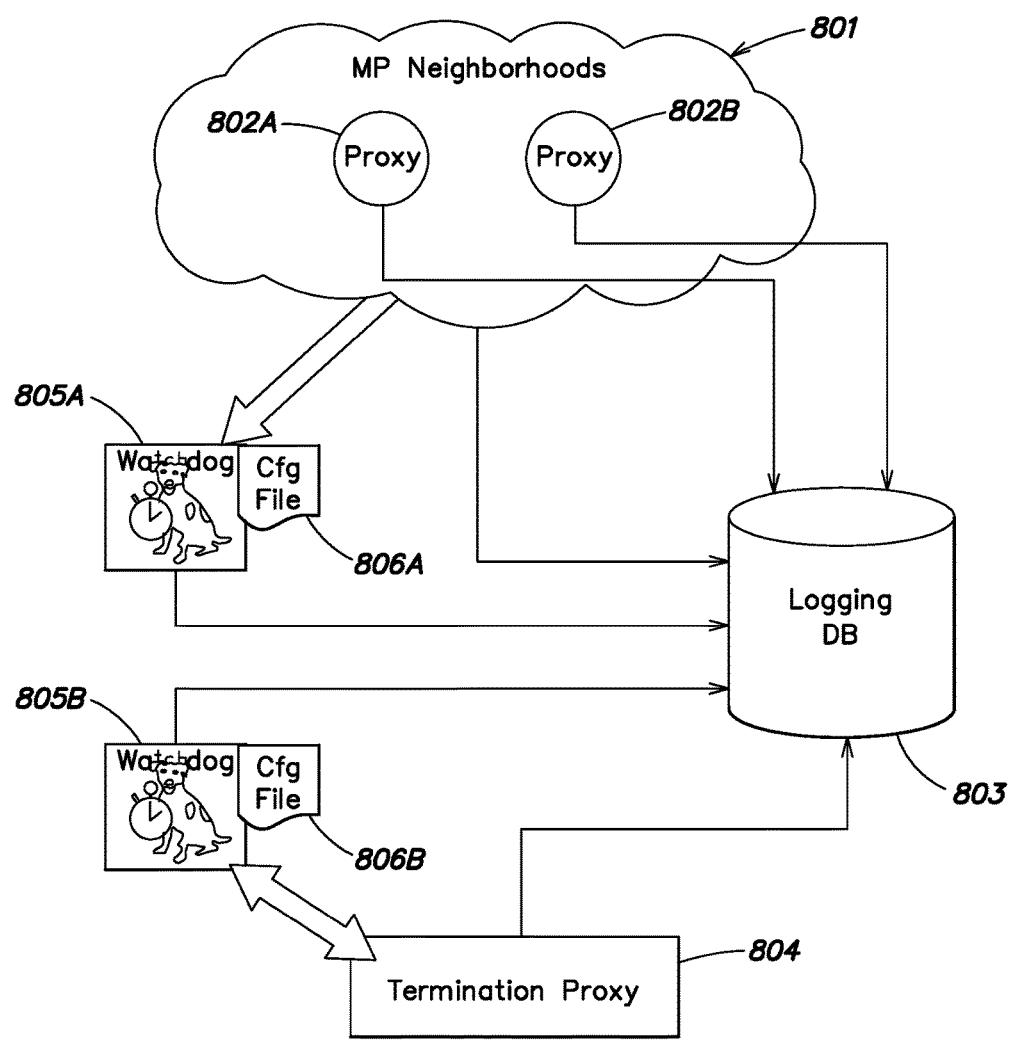
FIG. 8 shows an implementation of a logging database according to one embodiment of the present invention.

FIG. 8 shows an implementation of a logging database according to one embodiment of the present invention. In particular, it is realized that it may be beneficial to store historical information relating to processing of service requests. For instance, it may be helpful to review particular accesses, analyze historical information for trends, share information among Mechanism Proxies (MPs) so that new attacks can be dealt with, among other functions. As shown in FIG. 8, one or more MP neighborhoods 801 may be defined that include one or more proxy elements (elements 802A, 802B) that have the capability of logging information to a logging database 803. As discussed above, there may be one or more watchdog processes (element 805A) that monitor termination proxies, proxy neighborhoods, or other arrangement of proxies and log performance information to database 803. Also, there may be one or more watchdog processes (e.g., process 805B) that monitor a single termination proxy (e.g., proxy 804) and that are capable of logging performance information to database 803.

Figure 9:
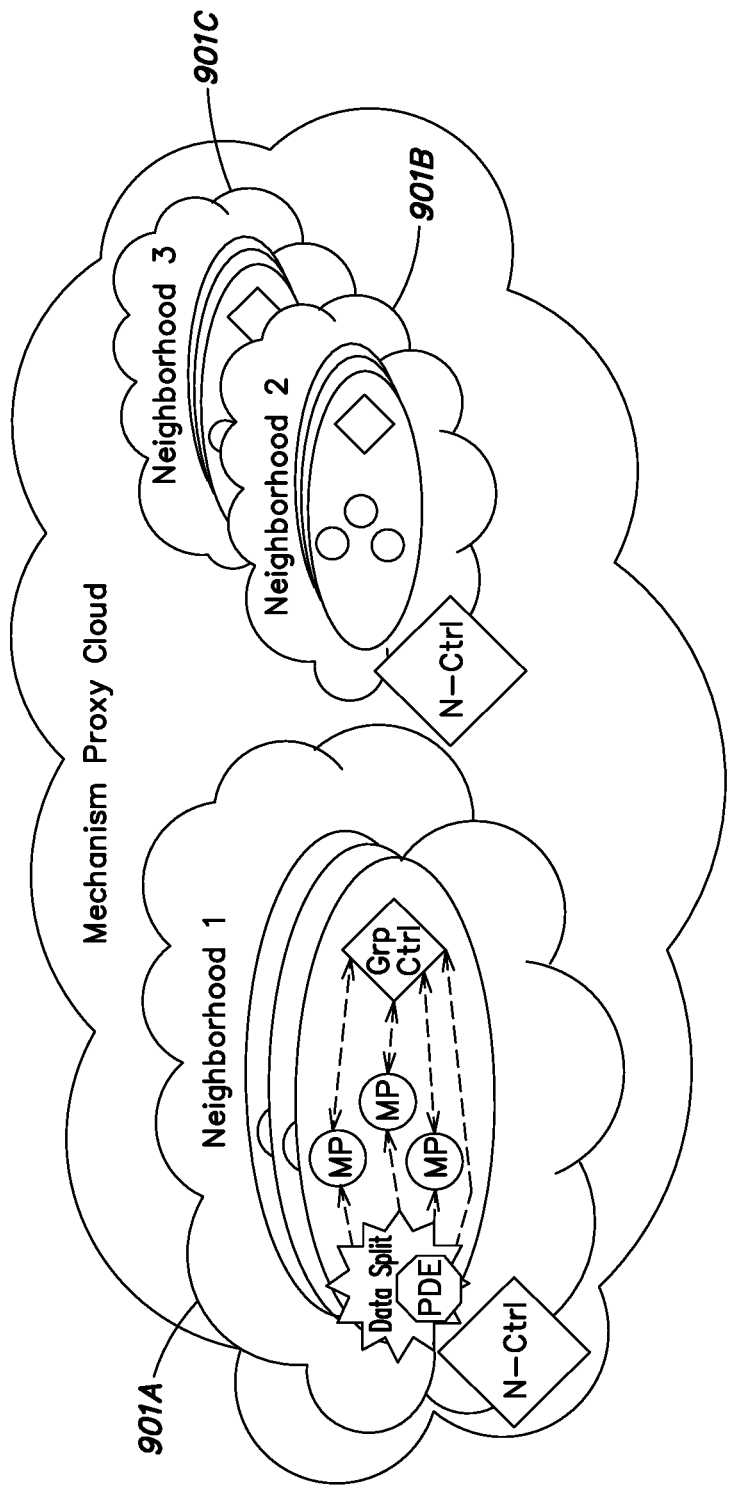
FIG. 9 shows an implementation of a Mechanism Proxy Cloud (MPC) according to one embodiment of the present invention.

As discussed above, Mechanism Proxies (MPs) in the APS architecture refer to prevention focused defensive mechanisms encapsulated in individual objects that function as proxies of a protected service or SOA component—i.e., these mechanisms are interposed before the protected asset with an aim to detect and stop malicious requests reaching the protected asset (inbound proxy) and succeeding in obtaining responses (outbound proxy). In a SOA system, there could be a number of such MPs performing checks on specific segments of application dataflow, collectively they can be referred to as the Mechanism Proxy Cloud (MPC). For instance, MPs operating on a particular stream of data flowing through the CZ can be described as one MPC. As shown in FIG. 9 and as discussed above, MPCs may be organized hierarchically. According to one embodiment, an MPC may have a hierarchical structure. In one implementation, located at the bottom of the hierarchy are individual mechanism proxies (MPs) implementing checking functionality, the next level up include proxy groups (PGs), and at the top of the hierarchy, neighborhoods are defined.

According to one embodiment, the MPC is partitioned into neighborhoods (e.g., neighborhoods 1-3 (elements 901A-901C)). In one embodiment, each of the neighborhoods is implemented as a process (single JVM) that serves one or more client connections. In one implementation, neighborhoods do not communicate with each other so that a level of containment is established. Neighborhoods can be deployed in separate virtual machines or hosts.

In one example, each client connection within a neighborhood is handled by a dedicated group of MP objects. The interconnected hosts on which the neighborhood processes are instantiated, the collection of neighborhood processes and the MP objects within a neighborhood exemplifies the notion of conglomerates that are at different system layers but are critically dependant on each other. For instance, a host crash impacts all the neighborhood (processes) running on that host, a process crash impacts all the MP groups running in that process, which in turn impacts all the clients that these groups support. Therefore, the initial configuration and ongoing behavior of these elements could be managed by an entity. In one embodiment, each host, each neighborhood, and each MP group includes a designated controller component responsible for management functions.

FIG. 9 shows a neighborhood-level (N-ctrl) controller and a group-level (Grp-ctrl) controller. Another designated component shown in FIG. 9 is the PDE, which is responsible for fanning out information to the individual MP objects within a group. According to one embodiment, each MP group has a PDE.

Figure 10:
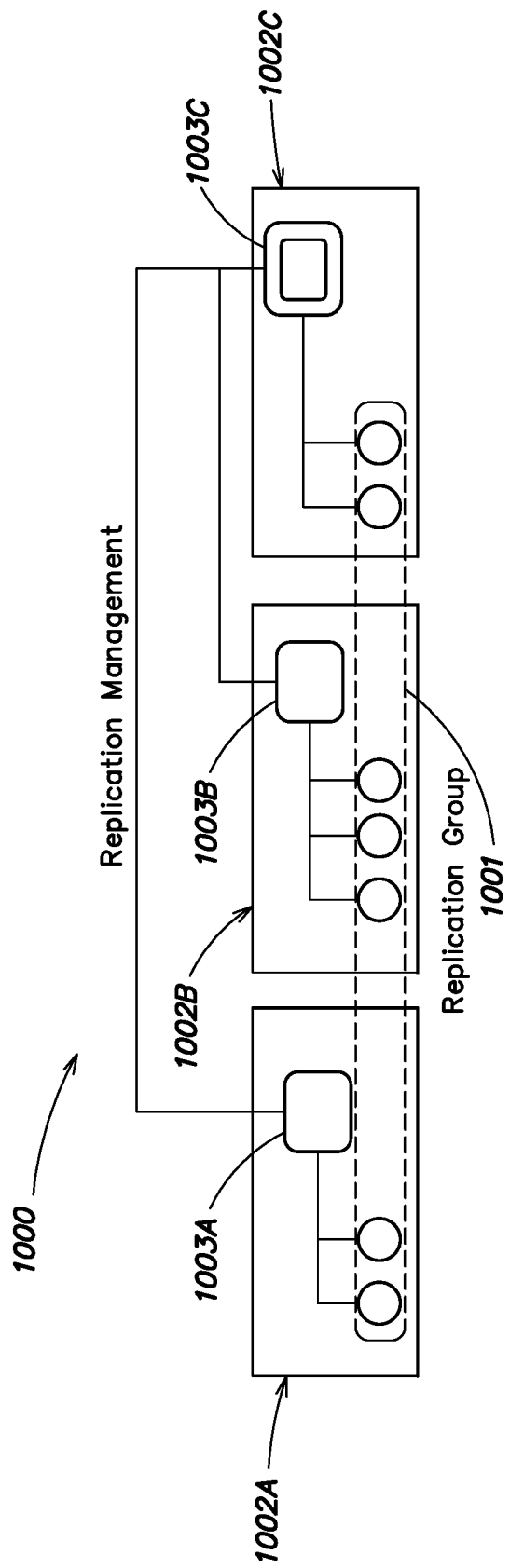
FIG. 10 shows an implementation of replication groups according to one embodiment of the present invention.

FIG. 10 shows an implementation of replication groups according to one embodiment of the present invention. In particular, FIG. 10 shows a conglomerate including replicas and replication managers. According to one embodiment, a conglomerate may be provided that includes a group of objects that are cooperatively responsible for a survivability objective. In one implementation, these objects may not be the same or perform the same function.

According to one embodiment, redundancy is used with diversity within the survivability architecture. To be effective in a dynamic situation such as being under attack, redundancy (and diversity) should be managed. Redundancy in the CZ system may be introduced using replication. At the application level, application objects/services can use active replication (where all replicas are concurrently active and providing service) or passive replication (where only one is actively providing service, and the others are used as back up or standby).

FIG. 10 shows replication of application/service objects (circles), with two levels of management. In one level, the replicas may be organized in a "replication group." According to one embodiment, members of the replica group may participate in group management protocols such as leader election, membership, replica conviction, and state synchronization (note that these apply to both active and passive replication schemes). In the other level, replica managers (rectangles) on each host (larger rectangles) monitor the replication group for replication level, replica location, host status, and attack indicators.

Replica managers may also kill convicted replicas and decide where to start new replicas and with what level of diversity. One of the replica managers may have a potential master-slave relation among the replica managers. In one implementation, replicas and their managers form a conglomerate. In one architecture example, TP and Application Servers are potential candidates for this kind of replication.

Figure 11:
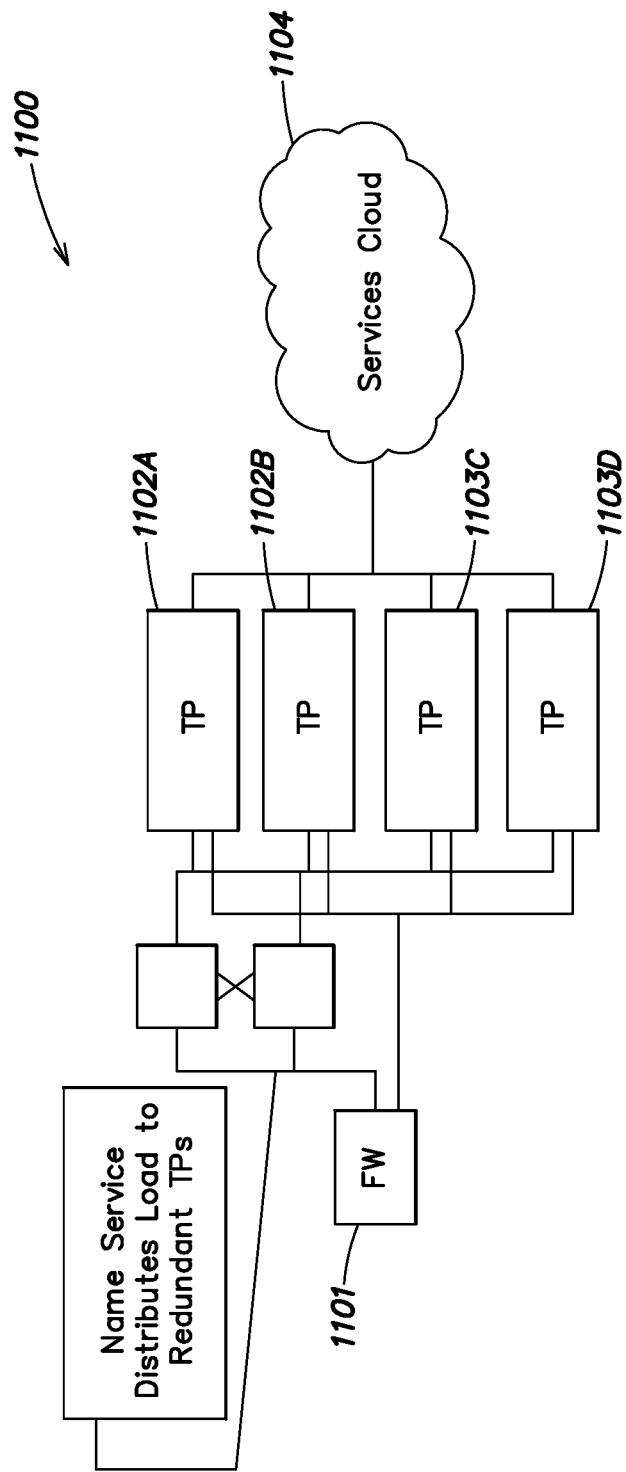
FIG. 11 is a redundant TP configuration according to one embodiment of the present invention.

The architecture may also be adapted to provide redundant services such as name service and may perform load balancing among TPs. FIG. 11 shows a simple load balancing "service delivery controller" design using Termination Proxies and Name Service. The TPs terminate the SSL connection to the actual services, and are the advertised service end points. Multiple TPs (e.g., 1103A-1103D) are registered with a highly available load balancing name service. High availability of the Name Service is achieved by two name service instances 1105 that monitor each other and support failover, so that the service consumers are guaranteed to have at least one name service available to them. Load balancing features of the name service may return a different TP in response to name service queries depending on the current load of the TPs. The redundant TPs interact with a "services cloud" 1104 that includes one or more application service installations.

Figure 12:
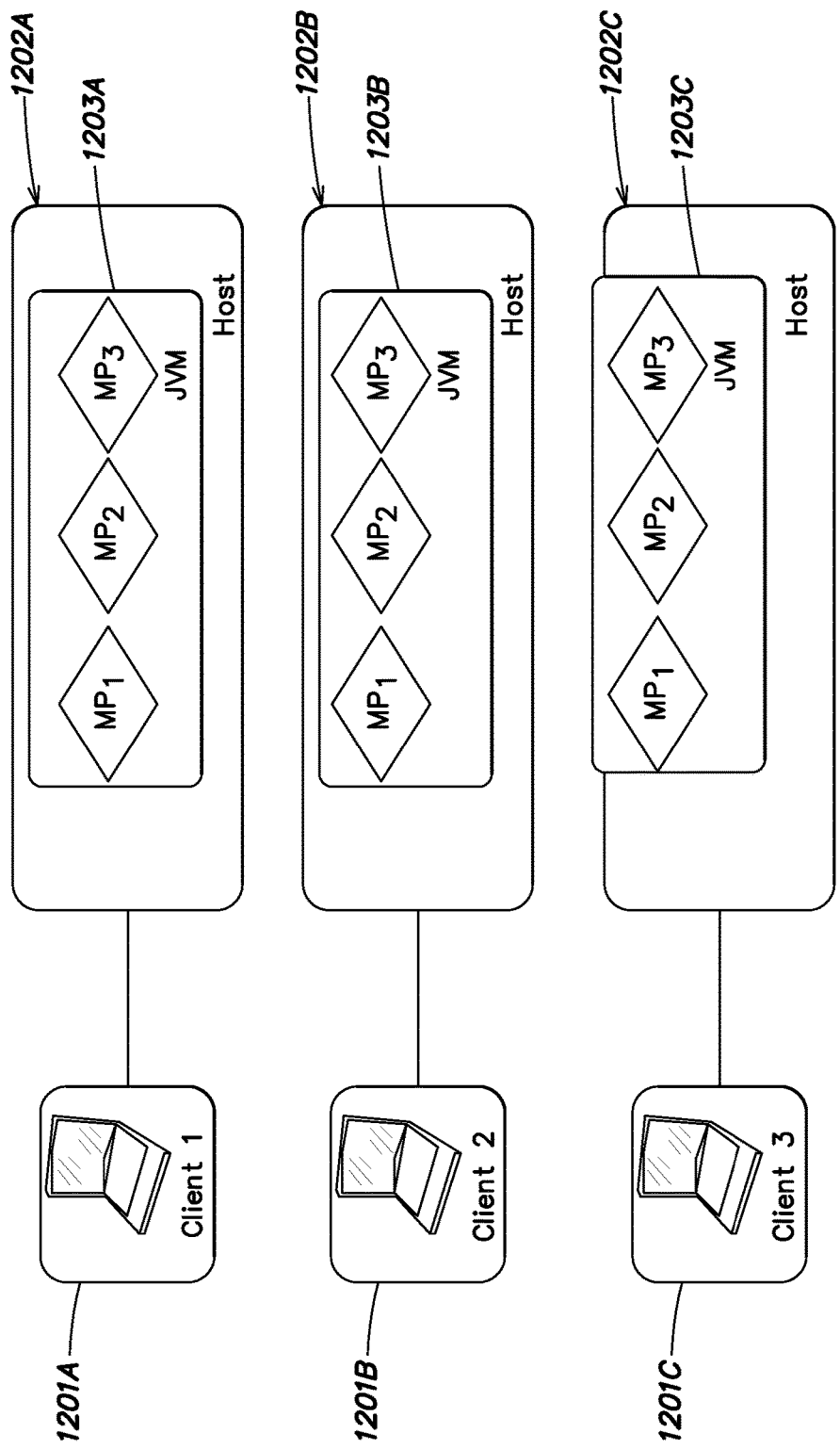
FIG. 12 is an implementation of MP groups providing fault isolation according to one embodiment of the present invention.

Another type of containment region that may be employed in the architecture may involve the way service request and response paths are handled for individual service consuming clients. For example, each TP may be configured to handle one or more clients and may escrow their traffic, but the TP does not perform the analyses, which are likely to be adversely affected in case of an attack (for example, the canary proxy described above). According to one embodiment, by encapsulating the analyses in the MPs, one level of containment is achieved between two functional responsibilities such as connection handling and analysis of content. Each MP is responsible for a focused protection-oriented analysis, and a single client service provider path can be analyzed by a group of MPs. However, if a single MP group is shared among multiple clients (e.g., three MPs within a JVM on a single host), there is containment across multiple clients. On the other hand, FIG. 12 shows a configuration where each MP group is dedicated to a single client-service provider interaction. The configuration in FIG. 12 offers stronger containment-a malicious client cannot adversely influence the operation of the other clients that are passing through MP groups running on separate hosts but this configuration has a higher resource footprint.

As shown in FIG. 12, respective clients 1201A-1201C are serviced by respective sets of MPs executed within JVMs 1203A-1203C executed on a number of respective hosts 1202A-1202C. As can be seen in FIG. 12, there is no interaction between other clients and a MP/JVM/Host group assigned to a particular client.

The placement and organization of the MPs offers a tradeoff space between containment and resource utilization. For the highest possible containment, one could run each MP isolated from others, and even the MPs executing within its own MP group. Such isolation can provide that each MP runs as its own process (JVM) and runs each such JVM on its own VM or on its own physical host. On the other hand, another configuration may include a shared JVM that hosts multiple distinct MP groups, and multiple JVMs are executed on a single virtual or physical host. In a deployment context, resource availability and threat level considerations dictate how deep the containment needs to be—with adaptive behavior support (e.g., reconnection and controlling how new client connections are distributed among a set of available resources). Sharing a JVM with multiple MP groups provides a balance when legitimate clients can tolerate a low level of disruption (e.g., loss of service for 10s of seconds). If a rogue client kills the JVM, the other clients sharing the crashed JVM can be reconnected quickly through another JVM while the rogue client is denied reconnection.

Figure 13:
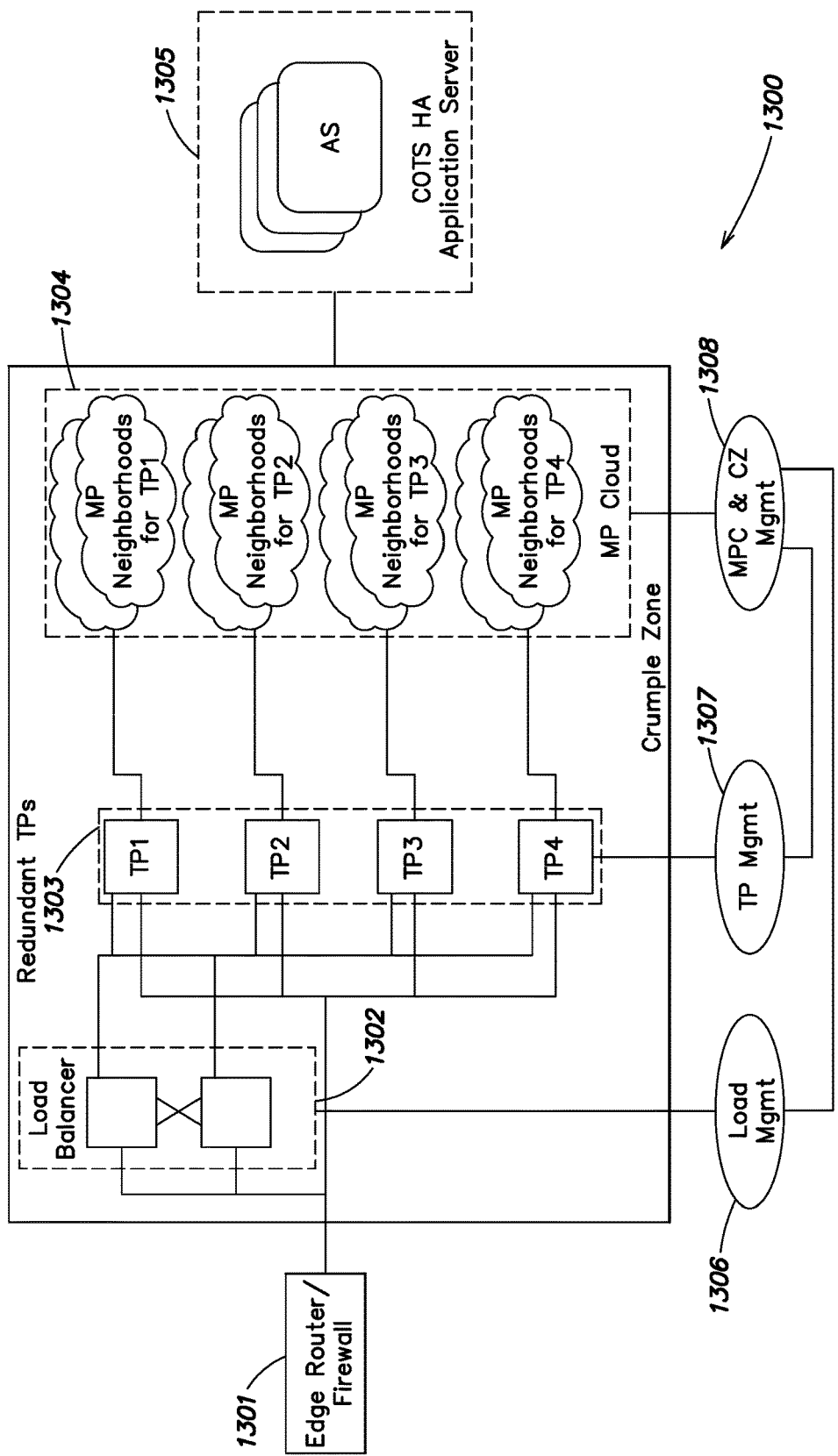
FIG. 13 is an implementation of a protection system implementing load balancing and 20 survivability according to one embodiment of the present invention.

A fuller version of a managed load balancing conglomerate in the context of an SOA protection platform is shown in FIG. 13. The diagram highlights functional relations between components, and it should be appreciated that there may be additional and/or redundant connections between components (e.g., there may be multiple connections between AS 1305 and the CZ).

In system 1300, there may be an edge router/firewall 1301 that receives requests from one or more entities. System 1300 may also include a load balancer 1302 that distributes new requests to a redundant number of TPs (element 1303). Each TP may have dedicated (one or more) MP neighborhoods (e.g., element 1304) which process the requests. If the processing by the MP neighborhoods is deemed releasable, the requests are delivered to a COTS HA Application Server 1305.

According to one embodiment, there are three distinct management aspects in this conglomerate: a) load management 1306: enforcing load distribution strategy and maintaining availability of the load balancing elements, b) termination proxy management 1307—monitoring load, and maintaining that there are appropriate number of TPs, killing, restarting (and reregistering) TPs as necessary, and c) mechanism proxy cloud management 1308: configuring the individual MPs and wiring them together, monitoring the status of MP neighborhoods, restarting them as necessary. Further, in one embodiment, the MPC management function may also be combined with the task of overall CZ management, which includes monitoring the incident reports and logs and making response decisions.

According to one embodiment of the present invention, there may be different types of Mechanism Proxies or MPs that perform different types of analyses on a service request or are otherwise configured to handle a type of request or detect a particular type of request. For instance, a client-server session gets its own proxy chain that might include one or more types of MPs. The following are several types of MPs that could be used during an MP analysis of an incoming service request:

1) Rate limiting MP: enforces a configurable limit on how many requests per second are accepted through the proxy chain.

2) Size checking MP: enforces a configurable limit on the message size accepted through the proxy chain.

3) White listing MP: if the class of a serialized object contained in the message does not belong to the white list of classes, the object is not passed through.

4) Canary Proxy (deserialization): deserializes the serialized objects contained in the message to determine if malicious code/content is embedded in the serialized data. The behavior of the canary proxy is then monitored to determine if the message is safe to pass through the proxy chain. For example, if the canary proxy dies, the message is not passed through.

5) SQL Validation MP: examines SQL content in the messages to determine if the message is safe to pass through. In addition to inspection-based release control, defense against SQL injection attacks may also include transforming the received SQL content into sanitized SQL content. Such transformations may be implemented as part of the TP as a counterpart to an SQL Validation MP.

Figure 14:
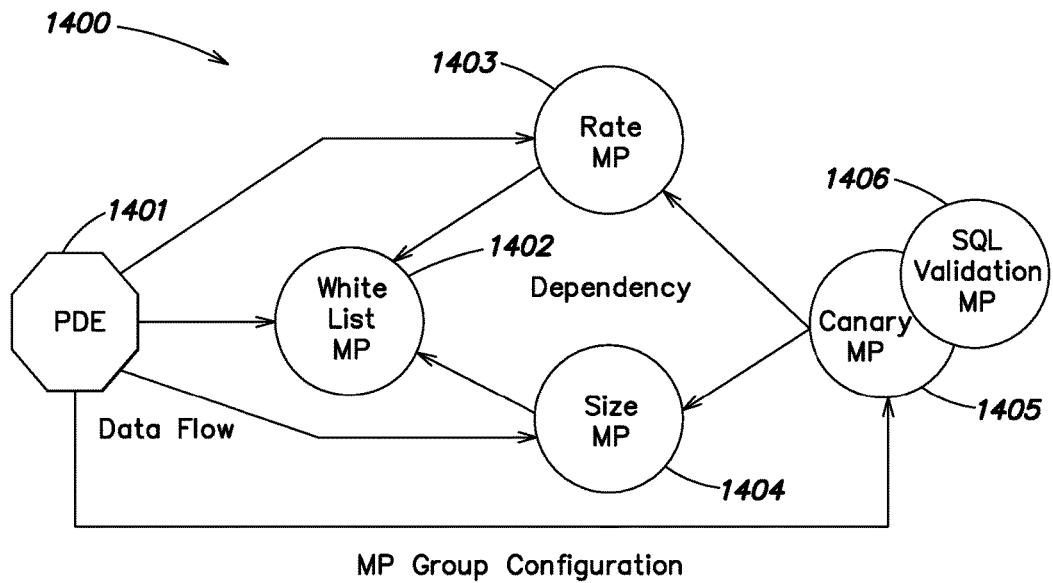
FIG. 14 is an example of a flexible MP group configuration according to one embodiment of the present invention.

The organization of the MPs in an example CZ implementation is shown by way of example in FIG. 14. The SQL Validation MP 1406 is showed together with the Canary MP 1405 because the SQL checks may be implemented as additional modules in the Canary Proxy feeding off the deserialized objects. This design avoids the additional cost of message parsing and deserialization that a separate SQL validation MP would have incurred.

As shown in the figure, MPs obtain their data from the PDE. There may be dependency relationships between the MPs. For instance, an arrow from a node N1 to a node N2 implies that N1 can process a sequence of bytes only if N2 has processed and released those bytes already. The dependency may determine what MP processing can happen in parallel without 30 wasting computation, which in turn influences how fast bytes are released from the escrow. As shown in FIG. 14, Rate MP 1403 and Size MP 1404 can process the received bytes only if the White List MP 1402 has determined that a received object is on a list of objects that is permitted to be passed through.

The dependencies are determined based on guidance from safe and secure composition, which carefully considers the impact of parallelization and attack effects on the MPC. For instance, the naive approach to feed all MPs in parallel will not lead to the most efficient configuration because bytes will not be released until the serialization proxy will dominate the delay. On the other hand, if a lightweight MP (e.g., White List MP 1402) precedes a heavyweight MP (e.g., Canary MP 1405, SQL Validation MP 1406), for the cases where the lightweight MP decides to reject a message, it may be possible to initiate more heavy weight processing for that message altogether.

Figure 15:
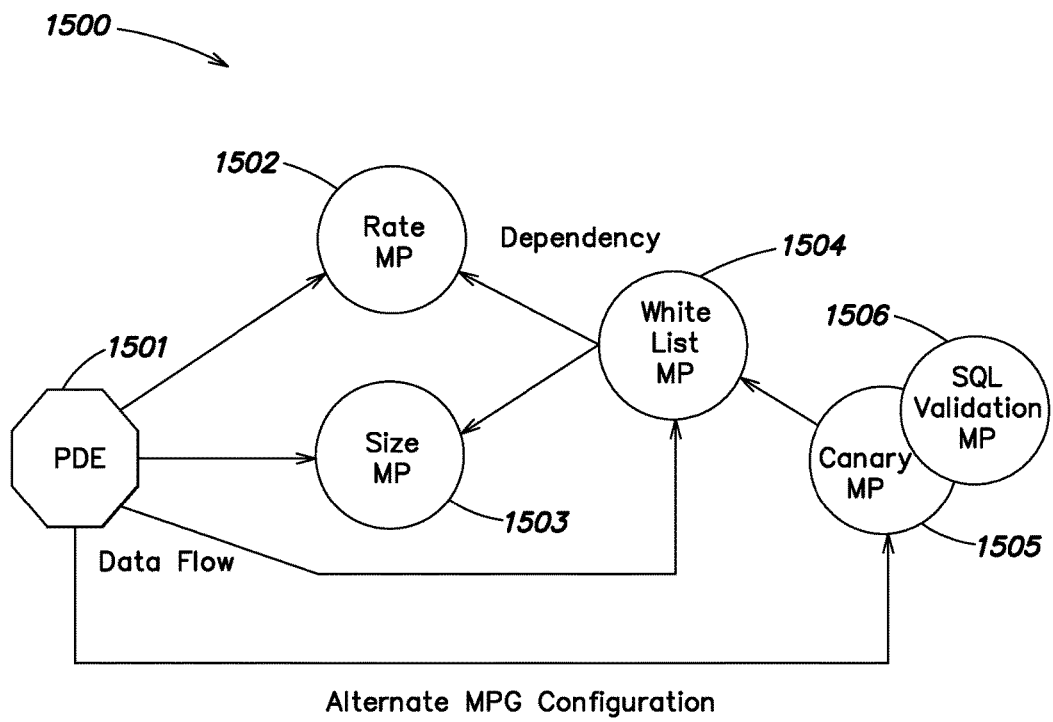
FIG. 15 shows another example of a flexible MP group configuration according to one embodiment of the present invention.

In the arrangement shown in FIG. 14, it may be assumed that white list processing is more lightweight than other types of MP processing. However, if the white list is very large, and determining whether the serialized object is acceptable or not takes a long time, then it may be better to perform rate and size checks in parallel and before the white list MP (e.g., as shown in FIG. 15). For instance as shown in FIG. 15, an alternate MPG configuration 1500 may be provided that performs rate and size MPs (elements, 1502, 1503) prior to executing a white list MP 1504. That is, there is a dependency between the white list MP 1504 and rate MP 1502 and size MP 1503, and prior to analyzing any data received from PDE 1501, checks must pass from rate MP 1502 and size MP 1503. The MPG configuration shown in FIG. 15 may still perform Canary MP 1505 and SQL validation MP 1506 towards the end of the overall MPG analysis process.

Figure 16:
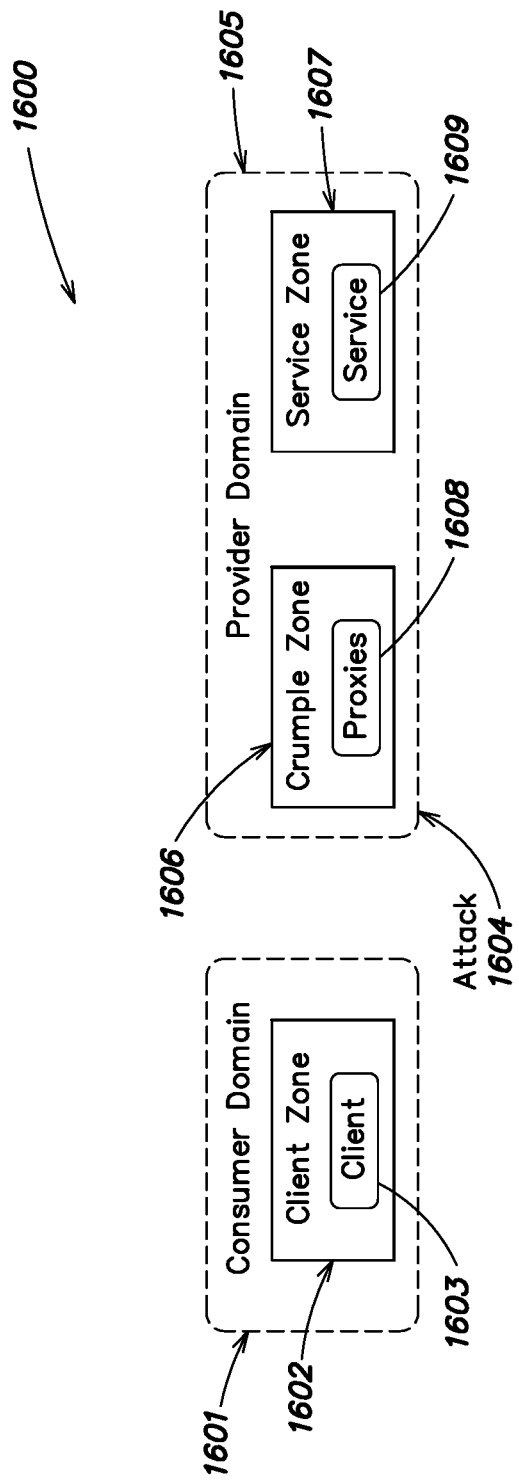
FIG. 16 shows a crumple zone (CZ) administered within a service provider domain according to one embodiment of the present invention.

Generally, and as discussed earlier, a higher level of structural and operational endurance and ruggedness can be achieved in software systems by strategically introducing Crumple Zones (CZs) in the system architecture. Analogous to the crumple zone in an automobile, a CZ stands before critical components and "absorbs" the effects of attacks by localizing or eliminating the damage they can cause and leaving the critical components intact and unaffected. The concept of software CZ is broadly applicable whenever there is a trust differential between interacting parties—i.e., one side is less trusted than the other and there is risk that interactions with entities in the less trusted region open up the more trusted assets to malicious attacks. As shown in FIG. 16, a fairly typical situation that arises in the context of SOA is remote service consumers accessing services through an open public (e.g., the Internet) or protected shared network (e.g., NIPRNet).

As shown in FIG. 16, a client 1603 within a client zone 1602 located in a consumer's domain 1601 may desire to access a service 1609 within a service zone 1607. Within provider domain 1605, the crumple zone 1606 including proxies 1608 may be placed between the consumer domain and the service zone 1607. If an attack 1604 were to occur, the couple zone 1606 would absorb the attack and the service 1609 would remain available to client requests.

Figure 17A:
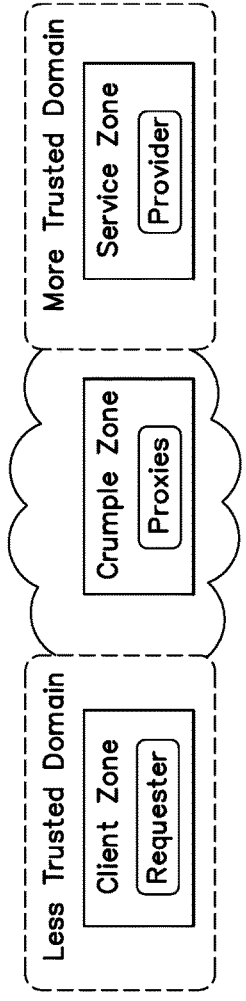
FIGS. 17 A-D shows various CZ implementations in accordance with some embodiments of the present invention.
Figure 17B:
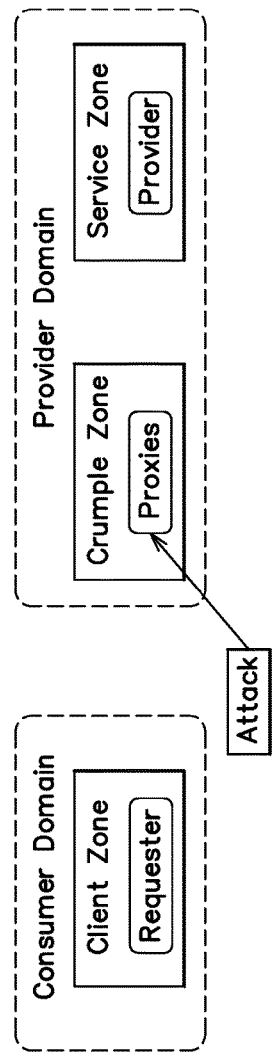

FIGS. 17A-17D show various configurations of domains that use a crumple zone. For instance, as shown in FIG. 17A, a less trusted domain may be separated from a more trusted domain using a crumple zone. In this case, a requester is isolated from a provider in the service zone by one or more proxies. As shown in FIG. 17B, the crumple zone may be located within the provider domain and the interface to a particular service within a service zone may be exposed to a requester by the crumple zone. In yet another example implementation, as shown in FIG. 17C, the consumer domain may also include a crumple zone that protects clients from attack. In yet another configuration as shown in FIG. 17D, a crumple zone may be used to bridge between a consumer domain and provider domain.

To provide a thorough scrutiny of the data bits that is able to defend against novel and unknown attacks whose signatures are not known a priori, a two prong defense strategy may be used to implement the CZ proxies. In one, the proxies inspect the data passing through at various levels of abstraction such as the raw network packets, SSL packets, byte arrays at the OS (sockets) level, and application level objects. The purpose of such inspection is to detect and stop ill-formed elements as well as well-formed elements that are known to have undesired behavior (i.e., known signatures). Ill-formed entities can be found at any of the abstraction layers and can trigger known or unknown implementation flaws. The other part of the strategy involves emulation, where the proxy partially emulates the execution and functional behavior of the protected functions and services with the objective to see if the received packet triggers any fault leading to any discernable error condition or failures. There are of course limitations on the extent to which protected functions can be emulated-if the function has side effects (such as persistence, database updates or interaction with remote entities) then emulating those behaviors in the CZ and then releasing the data to the protected services will imply performing these actions multiple times. Therefore the emulation at the proxies must stop before, or contain or compensate for these actions. According to one aspect, it is appreciated that a significant reduction in attack opportunity can be achieved by partial emulation. A full emulation essentially leads to replication of the protected service or function, and generally incurs considerable resource and performance overhead. For instance, one can think of voting on the outcome of the side-effect inducing interactions (such as responding to a remote entity, updating a file or database) and committing those only when all replicas agree.

In one embodiment, inspection-based and emulation-based proxies are collectively described as a mechanism proxy cloud (MPC). The proxies in the MPC may be dynamically created and destroyed on dedicated hardware resources which can range from a single host to a set of interconnected hosts.

To make the CZ non-bypassable, conventional network level protections such as firewalls and routers are used. To make it difficult for adversaries to discover and access protected services, the CZ presents a very small exploitable surface to untrusted service consumers. This is accomplished by placing the crumple zone behind a firewall that uses single packet authorization (SPA). On the CZ's side of the firewall, termination proxies (TPs) are used as the entry point for all incoming client connections.

Data integrity within the CZ may be preserved by service layer virtual private groups (slVPG). The Splitter component of the slVPG mechanism replicates SSL streams between clients and TPs to the MPC without breaking cryptographic envelopes. Key management components that are also part of the slVPG selectively share keys from the TPs to the MPC so that the new streams can be decrypted for inspection. The splitter is situated between the client and the TP for incoming (to the services enclave) and between the AS and the TP for outgoing (to the clients) traffic. An alternate CZ configuration is to distribute traffic to the MPC from the TP itself. In this configuration, the distribution happens after the TP terminates the client's SSL connection for inbound, and before the TP initiates the SSL connection to the client. In either direction, the TP distributes the traffic to the MPC in clear text.

There are slight differences in the integrity guarantee provided by the two configurations. When the traffic is split outside the TP, a corrupt TP obviously will not be able to send content that is different from the actual traffic for scrutiny to the MPC. If the TP distributes the content to the MPC, it can send different content for scrutiny and get it approved by the MPC when it should not be approved, but if approval from the proxies includes the signed content they are approving, the corrupt behavior of the TP can be detected by comparing the content checked by the MPC with that held in the escrow.

Figure 18A:
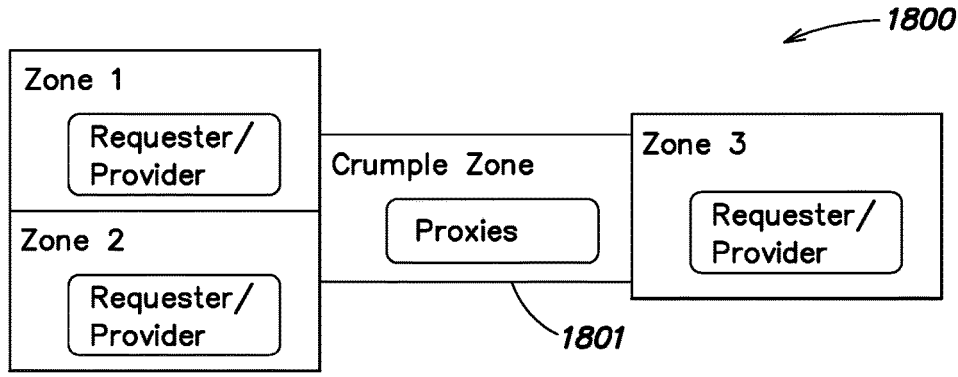
FIGS. 18A-B shows various CZ implementations according to some embodiments of the present invention.
Figure 18B:
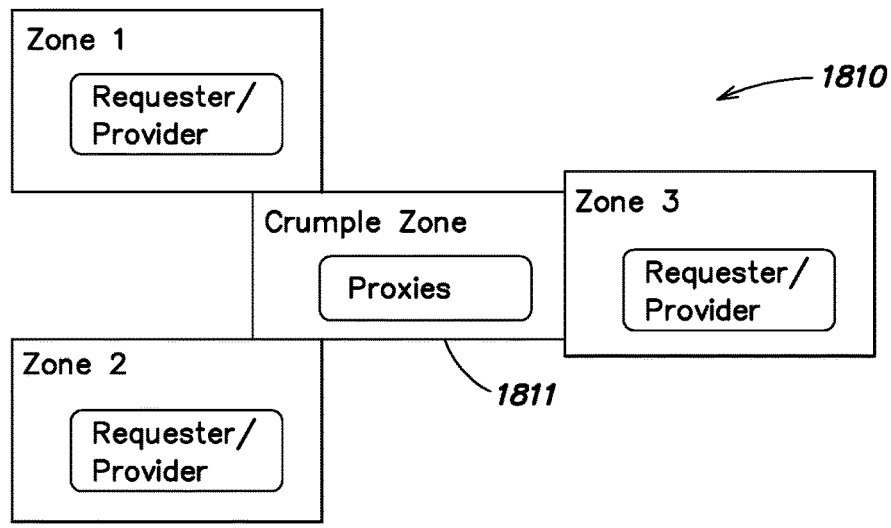

FIGS. 18A-18B show examples of various CZ implementations between zones according to some embodiments of the present invention. In particular, a crumple zone 1801 may be implemented in a distributed system 1800 where crumple zone 1801 is positioned between a protected zone and other zones. There may be instances where certain zones may access other zones without the benefit of a crumple zone (e.g., zone 1 to zone 2 communication). However, as shown in FIG. 18B, a crumple zone configuration may be used where a crumple zone may be disposed between more than two zones (e.g., crumple zone 1811 is interposed between three zones in distributed system 1810). In this case, requests originating from any zone are marshaled through crumple zone 1811, thereby protecting services located within each zone. Although configurations shown in distributed systems 1800, 1810 are shown by way of example, it should be appreciated that other CZ implementations between zones and services may be accomplished.

Example Computer Implementations

Processes described above are merely illustrative embodiments of systems that may be used to execute security operations. Such illustrative embodiments are not intended to limit the scope of the present invention, as any of numerous other implementations exist for performing the invention. None of the claims set forth below are intended to be limited to any particular implementation of protecting service-level entities in a distributed computer system, unless such claim includes a limitation explicitly reciting a particular implementation.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. According to one embodiment, the computer-readable medium may be non-transitory in that the computer-executable instructions may be stored permanently or semipermanently on the medium. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computerreadable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, ARM Cortex processor, Qualcomm Scorpion processor, or any other type of processor. It should be appreciated that one or more of any type computer system may be used to partially or fully automate extending offers to users and redeeming offers according to various embodiments of the invention. Further, the software design system may be located on a single computer or may be distributed among a plurality of computers attached by a communications network.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

A computer system may be a general-purpose computer system that is programmable using a high-level computer programming language. A computer system may be also implemented using specially programmed, special purpose hardware. In a computer system there may be a processor that is typically a commercially available processor such as the wellknown Pentium class processor available from the Intel Corporation. Many other processors are available. Such a processor usually executes an operating system which may be, for example, the Windows NT, Windows 2000 (Windows ME), Windows XP, Windows Vista or Windows 7 operating systems available from the Microsoft Corporation, MAC OS X Snow Leopard, MAC OS X Lion operating systems available from Apple Computer, the Solaris Operating System available from Oracle Corporation, iOS, Blackberry OS, Windows 7 Mobile or Android OS operating systems, or UNIX available from various sources. Many other operating systems may be used.

Some aspects of the invention may be implemented as distributed application components that may be executed on a number of different types of systems coupled over a computer network. Some components may be located and executed on mobile devices, servers, tablets, or other system types. Other components of a distributed system may also be used, such as databases (e.g., the mongoDB database available from MongoDB Inc.) or other component types.

The processor and operating system together define a computer platform for which application programs in high-level programming languages are written. It should be understood that the invention is not limited to a particular computer system platform, processor, operating system, or network. Further, it should be appreciated that multiple computer platform types may be used in a distributed computer system that implement various aspects of the present invention. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). Certain aspects of the present invention may also be implemented on a cloud-based computer system (e.g., the EC2 cloud-based computing platform provided by Amazon.com), a distributed computer network including clients and servers, or any combination of systems.

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Further, on each of the one or more computer systems that include one or more components of distributed system 100, each of the components may reside in one or more locations on the system. For example, different portions of the components of system 100 may reside in different areas of memory (e.g., RAM, ROM, disk, etc.) on one or more computer systems. Each of such one or more computer systems may include, among other components, a plurality of known components such as one or more processors, a memory system, a disk storage system, one or more network interfaces, and one or more busses or other internal communication links interconnecting the various components.

Figure 19:
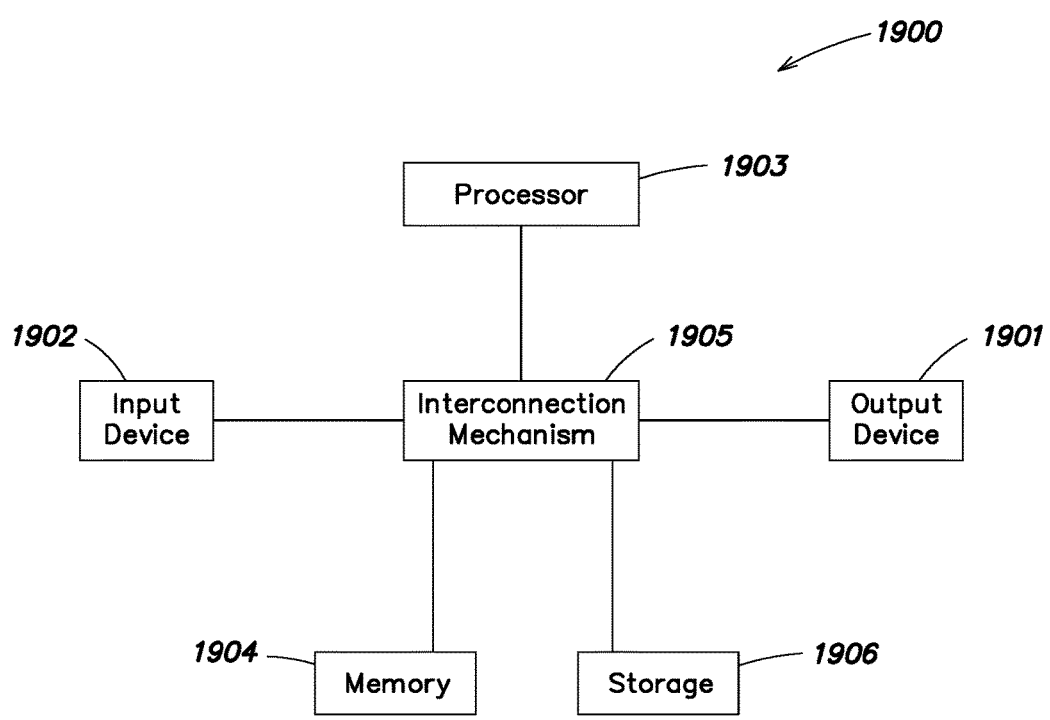
FIG. 19 shows an example computer system with which various aspects of the invention may be practiced.
Figure 20:
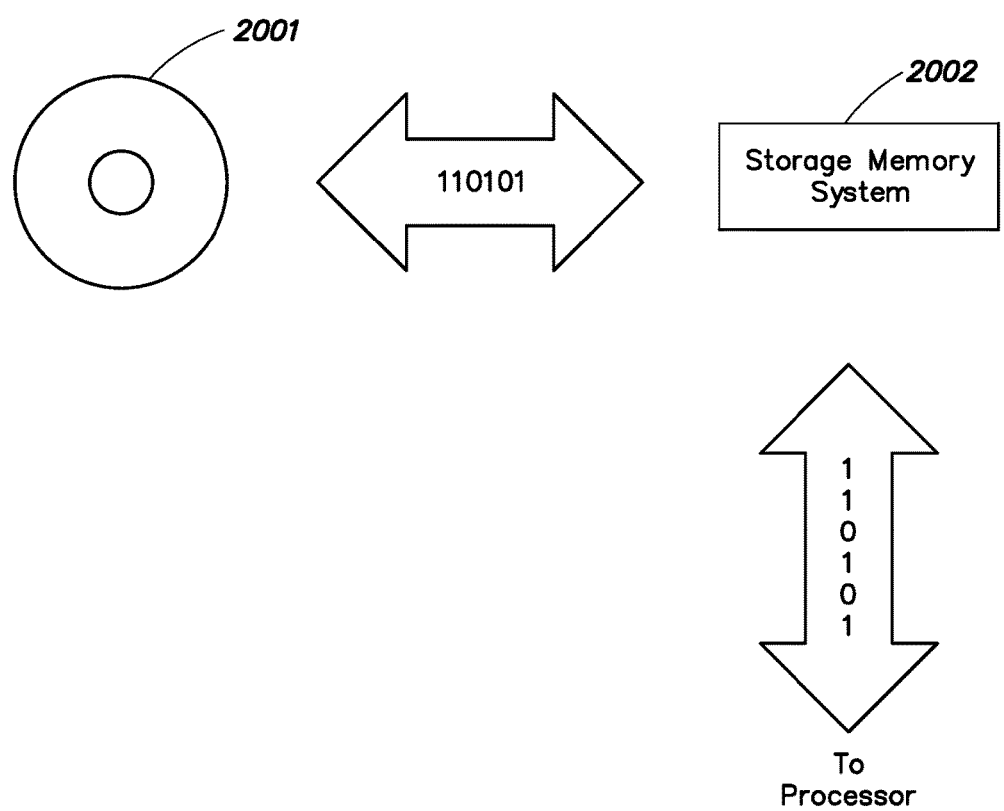
FIG. 20 shows an example storage system capable of implementing various aspects of the present invention.

Any number of systems of distributed system 100 may be implemented on a computer system described below in relation to FIGS. 19 and 20. In particular, FIG. 19 shows an example computer system 1900 used to implement various aspects. FIG. 20 shows an example storage system that may be used.

System 1900 is merely an illustrative embodiment of a computer system suitable for implementing various aspects of the invention. Such an illustrative embodiment is not intended to limit the scope of the invention, as any of numerous other implementations of the system, for example, are possible and are intended to fall within the scope of the invention. For example, a virtual computing platform may be used. None of the claims set forth below are intended to be limited to any particular implementation of the system unless such claim includes a limitation explicitly reciting a particular implementation.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate integration of the security services with the other systems and services according to various embodiments of the invention. Further, the software design system may be located on a single computer or may be distributed among a plurality of computers attached by a communications network.

For example, various aspects of the invention may be implemented as specialized software executing in a general-purpose computer system 1900 such as that shown in FIG. 19. The computer system 1900 may include a processor 1903 connected to one or more memory devices 1904, such as a disk drive, memory, or other device for storing data. Memory 1904 is typically used for storing programs and data during operation of the computer system 1900. Components of computer system 1900 may be coupled by an interconnection mechanism 1905, which may include one or more busses (e.g., between components that are integrated within a same machine) and/or a network (e.g., between components that reside on separate discrete machines). The interconnection mechanism 1905 enables communications (e.g., data, instructions) to be exchanged between system components of system 1900. Computer system 1900 also includes one or more input devices 1902, for example, a keyboard, mouse, trackball, microphone, touch screen, and one or more output devices 1901, for example, a printing device, display screen, and/or speaker. In addition, computer system 1900 may contain one or more interfaces (not shown) that connect computer system 1900 to a communication network (in addition or as an alternative to the interconnection mechanism 1905).

The storage system 1906, shown in greater detail in FIG. 20, typically includes a computer readable and writeable nonvolatile recording medium 2001 in which signals are stored that define a program to be executed by the processor or information stored on or in the medium 2001 to be processed by the program. The medium may, for example, be a disk or flash memory. Typically, in operation, the processor causes data to be read from the nonvolatile recording medium 2001 into another memory 2002 that allows for faster access to the information by the processor than does the medium 2001. This memory 2002 is typically a volatile, random access memory such as a dynamic random access memory (DRAM) or static memory (SRAM). It may be located in storage system 1906, as shown, or in memory system 1904, not shown. The processor 1903 generally manipulates the data within the integrated circuit memory 1904, 2002 and then copies the data to the medium 2001 after processing is completed. A variety of mechanisms are known for managing data movement between the medium 2001 and the integrated circuit memory element 1904, 2002, and the invention is not limited thereto. The invention is not limited to a particular memory system 1904 or storage system 1906.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1900 is shown by way of example as one type of computer system upon which various aspects of the invention may be practiced, it should be appreciated that aspects of the invention are not limited to being implemented on the computer system as shown in FIG. 19. Various aspects of the invention may be practiced on one or more computers having a different architecture or components that that shown in FIG. 19.

Computer system 1900 may be a general-purpose computer system that is programmable using a high-level computer programming language. Computer system 1900 may be also implemented using specially programmed, special purpose hardware. In computer system 1900, processor 1903 is typically a commercially available processor such as the wellknown Pentium, Core, Core Vpro, Xeon, or Itanium class processors available from the Intel Corporation. Many other processors are available. Such a processor usually executes an operating system which may be, for example, the Windows NT, Windows 1900 (Windows ME), Windows XP, Windows Vista or Windows 7 operating systems available from the Microsoft Corporation, MAC OS Snow Leopard, MAC OS X Lion operating systems available from Apple Computer, the Solaris Operating System available from Sun Microsystems, iOS, Blackberry OS, Windows 7 Mobile or Android OS operating systems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented using various Internet technologies such as, for example, the well-known Common Gateway Interface (CGI) script, PHP Hyper-text Preprocessor (PHP), Active Server Pages (ASP), HyperText Markup Language (HTML), Extensible Markup Language (XML), Java, JavaScript, Asynchronous JavaScript and XML (AJAX), Flash, and other programming methods. Further, various aspects of the present invention may be implemented in a cloud-based computing platform, such as the well-known EC2 platform available commercially from Amazon.com (Seattle, Wash.), among others. Various aspects of the invention may be implemented as programmed or non-programmed elements, or any combination thereof.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for performing security functions in a computer system hosting a network-facing server application, comprising acts of:
   receiving, by a service request processor, a service request to an application adapted to process the service request;
   responsive to the service request being a first request for the application to communicate over a network, processing the service request with a first proxy process isolated in memory from the application;
   responsive to the service request being a second request for the application to access a physical storage device, processing the service request with a second proxy process isolated in memory from the application; and responsive to a determination that the processed service request will not adversely affect the application, providing the processed service request to the application.

2. The method of claim 1, further comprising, responsive to the service request being a third request for the application to interact with a user interface device, processing the service request with a third proxy process isolated in memory from the application.

3. The method of claim 2, wherein processing the service request with the third proxy process comprises intercepting the service request using at least one of library interposition and device-driver interposition.

4. The method of claim 2, wherein the user interface device is at least one of a keyboard and a mouse.

5. The method of claim 1, further comprising, responsive to a determination that the processed service request may adversely affect the application, preventing the processed service request from being provided to the application.

6. The method of claim 1, further comprising, responsive to a determination that the processed service request may adversely affect the application, logging information about the processed service request.

7. The method of claim 1, wherein processing the service request with the first or second proxy process comprises inspecting at least one static characteristic of the service request.

8. The method of claim 7, wherein the at least one static characteristic of the service request comprises at least one of a source of the service request, data payload content, a control payload content, a protocol, and a syntax.

9. The method of claim 1, wherein processing the service request with the first or second proxy process further comprises:
executing the service request in an emulation environment; and
inspecting at least one dynamic characteristic of the service request during execution of the service request.

10. The method of claim 9, wherein the at least one dynamic characteristic comprises at least one of an action performed during execution of the service request, an event trace, and a resource usage amount.

11. The method of claim 9, wherein executing the service request includes partially executing the service request.

12. The method of claim 1, wherein processing the service request with the first or second proxy process comprises modifying at least one aspect of the service request.

13. The method of claim 12, wherein the at least one aspect comprises at least one of a parameter of the service request, a set of data acted upon by the service request, a SQL command, and a result of the service request.

14. The method of claim 1, wherein the application is at least one of a server application, a containerized application, and a virtual machine.

15. The method of claim 1, wherein processing the service request with the first proxy process comprises intercepting the service request using at least one of packet capture and packet hooking.

16. The method of claim 1, wherein processing the service request with the first proxy process comprises intercepting the service request using at least one of library interposition, network interface interposition, device-driver interposition, and a logical virtualized networking layer.

17. The method of claim 1, wherein processing the service request with the second proxy process is performed on at least one of a block level and a file system level.

18. The method of claim 1, wherein processing the service request with the second proxy process comprises intercepting the service request using at least one of library interposition, device-driver interposition, and file system interposition.

19. A system comprising:
an application processor configured to execute an application adapted to process a service request;
a request processor configured to receive a service request directed to the application and selectively provide the service request to the application processor; and
a proxy processor, isolated from the application processor, configured to:
receive the service request from the request processor;
process the service request with a first proxy process responsive to the service request being a first request for the application to communicate over a network;
process the service request with a second proxy process responsive to the service request being a second request for the application to access a physical storage device; and
responsive to a determination that the processed service request will not adversely affect the application, cause the request processor to provide the processed service request to the application processor.

20. The system of claim 19, wherein the proxy server is further configured to process the service request with a third proxy process responsive to the service request being a third request for the application to interact with a user interface device.

* * * * *